(12) United States Patent
Sato et al.

(10) Patent No.: US 12,053,698 B2
(45) Date of Patent: Aug. 6, 2024

(54) STORAGE MEDIUM, INFORMATION PROCESSING SYSTEM, INFORMATION PROCESSING APPARATUS AND INFORMATION PROCESSING METHOD

(71) Applicant: NINTENDO CO., LTD., Kyoto (JP)

(72) Inventors: Shintaro Sato, Kyoto (JP); Shinya Nakagawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 369 days.

(21) Appl. No.: 17/584,664

(22) Filed: Jan. 26, 2022

(65) Prior Publication Data
US 2022/0258046 A1 Aug. 18, 2022

(30) Foreign Application Priority Data
Feb. 15, 2021 (JP) ................. 2021-021911

(51) Int. Cl.
*A63F 13/52* (2014.01)
*A63F 13/525* (2014.01)
(Continued)

(52) U.S. Cl.
CPC ............ *A63F 13/52* (2014.09); *A63F 13/525* (2014.09); *A63F 13/5252* (2014.09);
(Continued)

(58) Field of Classification Search
CPC ........ A63F 13/837; A63F 13/53; A63F 13/56; A63F 13/525; A63F 13/843;
(Continued)

(56) References Cited

U.S. PATENT DOCUMENTS 9,327,191 B2 * 5/2016 Miyamoto ............ A63F 13/335
9,662,574 B2 * 5/2017 Ohta ....................... A63F 13/67
(Continued)

FOREIGN PATENT DOCUMENTS

EP 2446949 5/2012
EP 3345665 7/2018
(Continued)

OTHER PUBLICATIONS

Notice of Reasons for Refusal dated Jan. 18, 2024 for Japanese Patent Application No. 2021-021911 (with translation), 9 pages.
(Continued)

*Primary Examiner* — William H McCulloch, Jr.
(74) *Attorney, Agent, or Firm* — Nixon & Vanderhye, PC

(57) ABSTRACT

An example of an information processing system causes a player object to exit a game stage at least when the player object satisfies an exit condition as a result of an attack by an enemy object. After the player object exits from the game stage, (a) when a first condition is satisfied, the information processing system returns the player object based on a designated position that is specified by a return input of a first type, which is a position in a first area of the game stage, and (b) when a second condition different from the first condition is satisfied, the information processing system returns the player object based on a designated position that is specified by a return input of a second type, which is a position of a movement target object arranged on the game stage.

30 Claims, 15 Drawing Sheets

(51) Int. Cl.
*A63F 13/5252* (2014.01)
*A63F 13/5258* (2014.01)
*A63F 13/53* (2014.01)
*A63F 13/56* (2014.01)
*A63F 13/843* (2014.01)
*A63F 13/5255* (2014.01)
*A63F 13/5372* (2014.01)
*A63F 13/837* (2014.01)
*A63F 13/847* (2014.01)

(52) U.S. Cl.
CPC .......... *A63F 13/5258* (2014.09); *A63F 13/53* (2014.09); *A63F 13/56* (2014.09); *A63F 13/843* (2014.09); *A63F 13/5255* (2014.09); *A63F 13/5372* (2014.09); *A63F 13/837* (2014.09); *A63F 13/847* (2014.09)

(58) Field of Classification Search
CPC ................ A63F 13/847; A63F 13/5258; A63F 13/5252; A63F 13/52; A63F 13/5255; A63F 13/5372
See application file for complete search history.

(56) References Cited

U.S. PATENT DOCUMENTS

| | | | | |
|---|---|---|---|---|
| 9,943,758 | B2 * | 4/2018 | Sato | A63F 13/53 |
| 10,500,492 | B2 * | 12/2019 | Sato | A63F 13/837 |
| 10,589,174 | B2 * | 3/2020 | Fukuda | A63F 13/30 |
| 10,617,953 | B2 * | 4/2020 | Sato | A63F 13/837 |
| 10,918,945 | B2 * | 2/2021 | Azmandian | A63F 13/5258 |
| 11,045,734 | B2 * | 6/2021 | Kando | A63F 13/847 |
| 11,058,951 | B2 * | 7/2021 | Sato | A63F 13/53 |
| 11,154,785 | B2 * | 10/2021 | Nakano | A63F 13/795 |
| 11,344,809 | B2 * | 5/2022 | Kando | G06F 3/04842 |
| 11,471,767 | B2 * | 10/2022 | Sato | A63F 13/837 |
| 11,559,742 | B2 * | 1/2023 | Kando | G06F 1/1669 |
| 11,712,625 | B2 * | 8/2023 | Kando | G06F 3/0346 463/31 |
| 11,738,265 | B2 * | 8/2023 | Matsumoto | A63F 13/69 463/31 |
| 11,771,986 | B2 * | 10/2023 | Sato | A63F 13/837 463/31 |
| 11,771,991 | B2 * | 10/2023 | Sato | A63F 13/56 463/31 |
| 11,865,447 | B2 * | 1/2024 | Azmandian | A63F 13/53 |
| 2007/0188501 | A1 * | 8/2007 | Yee | G06T 15/20 345/473 |
| 2014/0028544 | A1 * | 1/2014 | Amano | G09G 5/00 345/156 |
| 2015/0328548 | A1 * | 11/2015 | Sato | A63F 13/53 463/31 |
| 2020/0206639 | A1 * | 7/2020 | Nakano | A63F 13/58 |
| 2022/0258046 | A1 * | 8/2022 | Sato | A63F 13/52 |
| 2024/0042327 | A1 * | 2/2024 | Sato | A63F 13/69 |

FOREIGN PATENT DOCUMENTS

| | | |
|---|---|---|
| JP | 2000-024317 | 1/2000 |
| JP | 2012-090844 | 5/2012 |
| JP | 2014-023719 | 2/2014 |
| JP | 2018-110659 | 7/2018 |
| JP | 2020-124533 | 8/2020 |

OTHER PUBLICATIONS

"Splatoon2 The Complete Guide," Kadokawa Corporation, dated Mar. 15, 2018, 6th edition, pp. 010, 034-039 (esp. p. 039), ISBN: 978-4-04-0893313-1, 11 pages.

* cited by examiner

STORAGE MEDIUM, INFORMATION PROCESSING SYSTEM, INFORMATION PROCESSING APPARATUS AND INFORMATION PROCESSING METHOD

CROSS REFERENCE TO RELATED APPLICATION

This application claims priority to Japanese Patent Application No. 2021-21911, filed on Feb. 15, 2021, the entire contents of which are incorporated herein by reference.

FIELD

The present disclosure relates to a storage medium storing an information processing program for executing a game process for controlling a player object in a three-dimensional virtual space, an information processing system, an information processing apparatus and an information processing method.

BACKGROUND AND SUMMARY

Conventionally, when a player object controlled by the player exits from the game stage (e.g., when defeated by another object), the player object is returned to a predetermined position on the game stage before the game is resumed.

Regarding how the game is resumed after the player object exits from the game stage, there has been room for improvement in view of the strategic aspect of the game.

Therefore, the present application discloses a storage medium storing an information processing program with which it is possible to improve the strategic aspect of the game, an information processing system, an information processing apparatus and an information processing method.

(1) An example of a non-transitory computer-readable storage medium stores therein instructions that cause a processor of an information processing apparatus to execute a game process that controls a player object and an enemy object on a game stage in a three-dimensional virtual space. When the instructions are executed by the processor of the information processing apparatus, the instructions cause the information processing apparatus to perform operations comprising: controlling a movement of the player object based on an input by a player on the game stage; controlling a movement of the enemy object irrespective of an input by the player on the game stage; displaying, on a display device, an image of the three-dimensional virtual space as viewed from a viewpoint that is moved in a manner such as to follow the movement of the player object; causing the player object to exit from the game stage at least when the player object satisfies an exit condition as a result of an attack by the enemy object; displaying, on the display device, an image of the three-dimensional virtual space as viewed from a viewpoint of a bird's-eye position where at least a first area of the game stage is viewed from above after the player object exits from the game stage; after the player object exits from the game stage, (a) when a first condition is satisfied, returning the player object based on a designated position that is specified by a return input of a first type, which is a position in the first area of the game stage, and (b) when a second condition different from the first condition is satisfied, returning the player object based on a designated position that is specified by a return input of a second type, which is a position of a movement target object arranged on the game stage; and controlling the movement of the player object based on an input by the player after the player object returns onto the game stage.

With configuration (1) above, since it is possible to increase the variety of choices that can be employed by the player when returning onto the game stage, it is possible to possible to improve the strategic aspect of the game regarding the return.

(2) In configuration (1) above, the movement target object may be a teammate object whose movement is controlled based on an input by a teammate player who is different from the player.

With configuration (2) above, since the player can play the game advantageously by cooperating with a teammate player regarding the return of the player object, it is possible to improve the strategic aspect regarding the return onto the game stage.

(3) In configuration (1) or (2) above, the storage medium may further store therein instructions that cause the information processing apparatus to perform operations comprising: when a teammate object satisfies an exit condition as a result of an attack by the enemy object, causing the teammate object to exit from the game stage, wherein a movement of the teammate object is controlled based on an input by a teammate player who is different from the player; and when a return input of the first type is made by the teammate player after the teammate object exits from the game stage, returning the teammate object based on a designated position that is specified by the return input of the first type by the teammate player, which is a position in the first area.

With configuration (3) above, it is possible to prevent a significant inequality for the return onto the game stage from occurring between players of the player's team.

(4) In configuration (3) above, when the player object having satisfied the exit condition exists from the game stage, the player object may be arranged at a first stand-by position that is different from the game stage. When the teammate object having satisfied the exit condition exits from the game stage, the teammate object may be arranged at a second stand-by position that is different from the game stage and different also from the first stand-by position.

With configuration (4) above, it is possible to vary the environment for returning onto the game stage between objects of the player's team, and it is therefore possible to improve the strategic aspect regarding the return onto the game stage.

(5) In any one of configurations (1) to (4) above, when the player object returns based on the designated position that is specified by the return input of the first type, the player object may move in a manner different from that when the player object returns based on the designated position that is specified by the return input of the second type.

With configuration (5) above, players can easily recognize the manner of movement, between two different methods, in which the player object is returning.

(6) Another example of a non-transitory computer-readable storage medium stores therein instructions that cause a processor of an information processing apparatus to execute a game process that controls a player object, a teammate object and an enemy object on a game stage in a three-dimensional virtual space. When the instructions are executed by the processor of the information processing apparatus, the instructions cause the information processing apparatus to perform operations comprising: controlling a movement of the player object based on an input by a player on the game stage; controlling a movement of the teammate object based on an input by a teammate player who is different from the player on the game stage; controlling a movement of the enemy object irrespective of an input by the player on the game stage; displaying, on a display device, an image of the three-dimensional virtual space as viewed from a viewpoint that is moved in a manner such as to follow the movement of the player object; causing the player object to exit from the game stage and arranging the player object at a first stand-by position that is different from the game stage at least when the player object satisfies an exit condition as a result of an attack by the enemy object; causing the teammate object to exit from the game stage and arranging the teammate object at a second stand-by position that is different from the game stage and different also from the first stand-by position at least when the teammate object satisfies the exit condition as a result of an attack by the enemy object; after the player object is arranged at the first stand-by position, returning the player object based on a designated position that is specified by a return input by the player, which is a position at least in a first area of the game stage; after the teammate object is arranged at the second stand-by position, returning the teammate object based on a designated position that is specified by a return input by the teammate player, which is a position in the first area; after the player object returns onto the game stage, controlling a movement of the player object based on an input by the player; and after the teammate object returns onto the game stage, controlling a movement of the teammate object based on an input by the teammate player.

With configuration (6) above, it is possible to vary the environment for returning onto the game stage between objects of the player's team, and it is therefore possible to improve the strategic aspect regarding the return onto the game stage.

(7) In any one of configurations (3), (4), and (7) above, when the designated position that is specified by the return input of the first type by the teammate player is included in a range of the game stage that is displayed on the display device, an image representing the designated position may be further displayed on the display device.

With configuration (7) above, the player can recognize the position at which the teammate object returns onto the game stage.

(8) In configuration (7) above, an action of the enemy object may be controlled by an input by an enemy player who is different from the player and the teammate player. The storage medium may further store therein instructions that cause the information processing apparatus to perform operations comprising: causing the enemy object to exit from the game stage at least when the enemy object satisfies the exit condition as a result of an attack from the player object or the teammate object; and after the enemy object exits from the game stage, (a) when a third condition is satisfied, returning the enemy object based on a designated position that is specified by a return input of the first type by the enemy player, and (b) when a fourth condition different from the third condition is satisfied, returning the enemy object based on a designated position that is specified by a return input of the second type by the enemy player, which is a position of a movement target object arranged on the game stage. Even when the designated position that is specified by the return input of the first type by the enemy player is included in a range of the game stage that is displayed on the display device, an image representing the designated position has no need to be displayed on the display device.

With configuration (8) above, it will not be too disadvantageous for an object returning onto the game stage.

(9) In any one of configurations (1) to (7) above, the storage medium may further store therein instructions that cause the information processing apparatus to perform operations comprising: when the enemy object satisfies the exit condition, causing the enemy object to exit from the game stage; and when a return condition is satisfied after the enemy object exits from the game stage, returning the enemy object to a position in a second area of the game stage. The first area and the second area may each include a portion that does not overlap with the other.

With configuration (9) above, it is possible to ensure a good strategic aspect of the game with the variety of return positions while ensuring a good playability by keeping it relatively easy to predict positions to which playable objects can return, and it is therefore possible to improve the balance between the playability and the strategic aspect regarding the return onto the game stage.

(10) In any one of configurations (1) to (9) above, the storage medium may further store therein instructions that cause the information processing apparatus to perform operations comprising: when the player object returns based on the designated position that is specified by the return input of the first type, giving the player object an effect in the game whereby the exit condition for the player object is less likely to be satisfied for a period of time from the return until elapse of a predetermined first time as compared with after the completion of the period.

With configuration (10) above, it is possible to reduce the possibility that the exit condition is satisfied immediately after the return of the player object.

(11) In any one of configurations (1) to (10) above, the storage medium may further store therein instructions that cause the information processing apparatus to perform operations comprising: setting an unrestricted area and a restricted area where the movement of the player object is more restricted than in the unrestricted area in the game stage. When the player object returns based on the designated position that is specified by the return input of the first type, the movement of the player object may be controlled without restriction of the restricted area even if the player object is located in the restricted area for a period of time from the return until elapse of a predetermined second time.

With configuration (11) above, it is easier for the player to move the player object immediately after the return, and it is possible to improve the controllability of the game.

(12) In any one of configurations (1) to (11) above, a position that is different from the game stage may be prohibited from being the designated position that is specified by the return input of the first type.

With configuration (12) above, it is possible to reduce the possibility that a position that is not appropriate becomes the designated position.

(13) In any one of configurations (1) to (12) above, when the player object returns based on the designated position that is specified by the return input of the first type, the player object may move from a position that is different from the game stage toward the designated position. A moving direction of the player object may be changed based on an input by the player during the move.

With configuration (13) above, it is easier for the player to adjust the position at which the player object returns.

(14) In any one of configurations (1) to (13) above, when the return input of the second type is made during a period since a start of the return of the player object in response to the return input of the first type until the return of the player object, the player object may move based on the designated position that is specified by the return input of the second type.

With configuration (14) above, it is possible to increase the variety of strategies that can be employed by the player after the player object returns, thus improving the strategic aspect of the game.

(15) In any one of configurations (1) to (14) above, when a predetermined input is made by the player or a first stand-by time elapses after the player object exits from the game stage, the player object may transition to a designated position setting state in which the designated position by the return input of the first type is set. The return of the player object may be started upon elapse of a second stand-by time since the transition of the player object to the designated position setting state.

With configuration (15) above, the player can adjust the timing for the player object to return onto the game stage.

Note that the present specification discloses an example of an information processing apparatus or an information processing system for executing the processes of (1) to (15) above. Also, the present specification discloses an example of a game processing method for executing the processes of (1) to (15) above.

With the storage medium, the information processing system, the information processing apparatus and the information processing method set forth above, it is possible to improve the strategic aspect of the game.

These and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

1. Configuration of Game System

Figure 1:
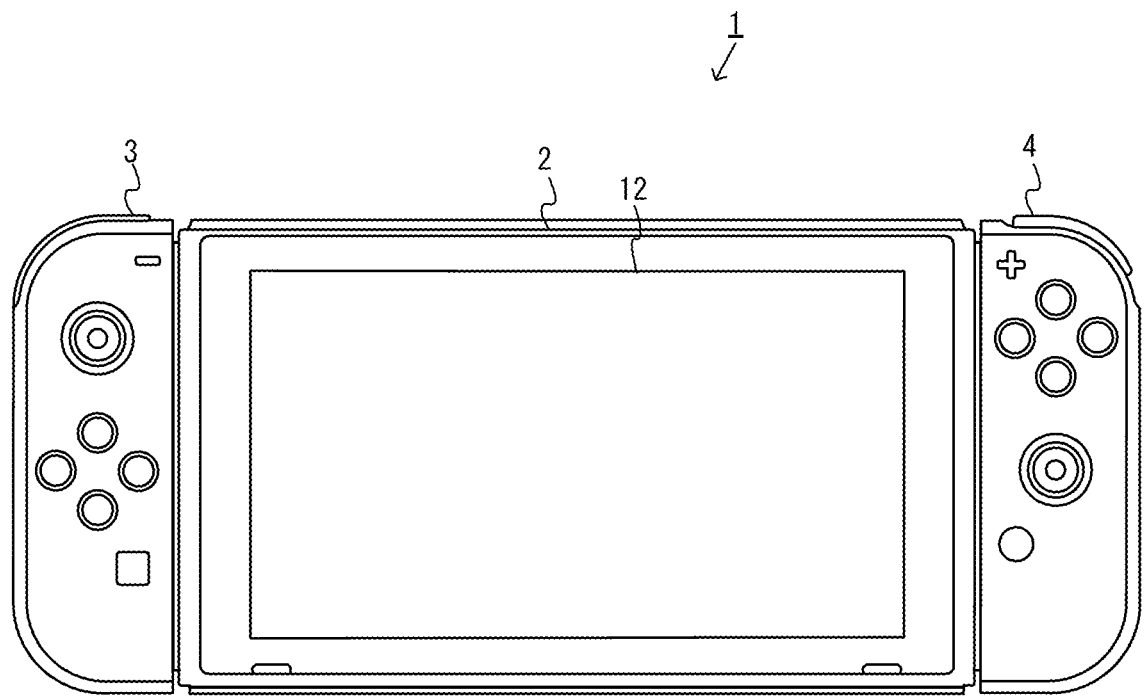
FIG. 1 is a view showing an example of a non-limiting game system.

A game system according to an example of the present embodiment will now be described. FIG. 1 is a view showing an example of a game system. The example of a game system 1 of the present embodiment includes a main body apparatus (an information processing apparatus, which in the present embodiment functions as a game apparatus main body) 2, a left controller 3 and a right controller 4. The main body apparatus 2 is an apparatus for executing various processes (e.g., game processes) performed on the game system 1. The left controller 3 and the right controller 4 are each a device including an operation section used by the user to make inputs.

Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies. It should be noted that hereinafter, the left controller 3 and the right controller 4 will occasionally be referred to collectively as a "controller".

Figure 2:
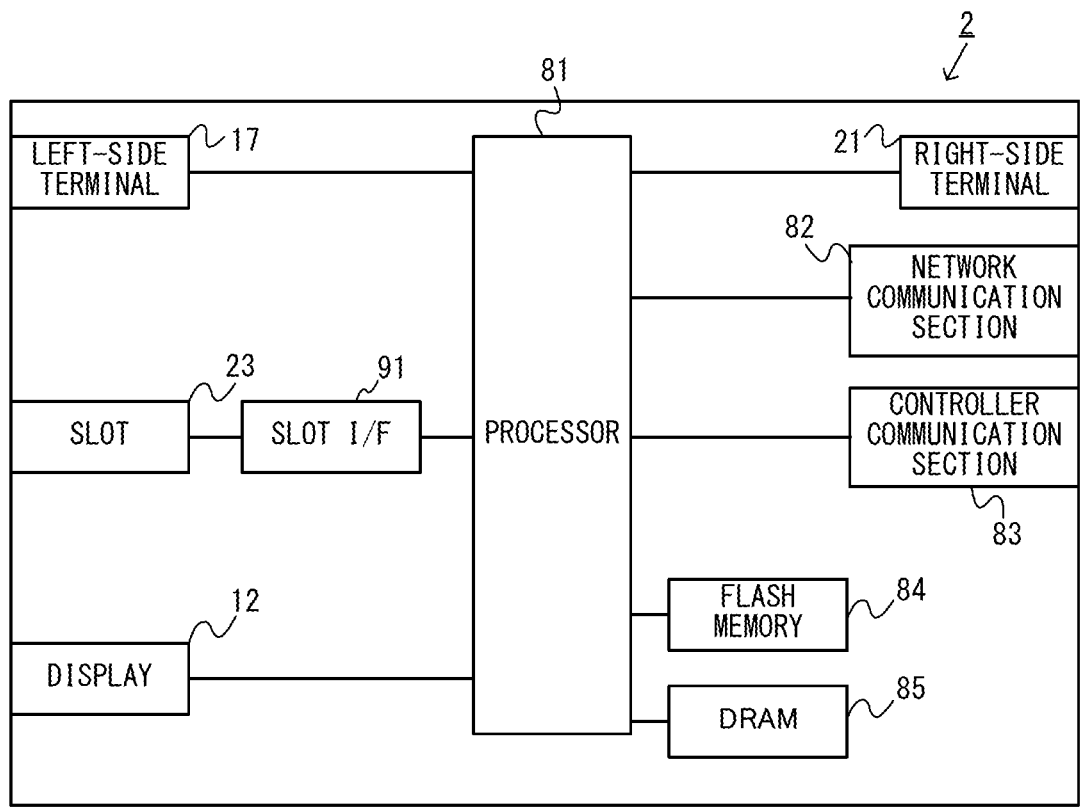
FIG. 2 is a block diagram showing an example of an internal configuration of a non-limiting main body apparatus.

FIG. 2 is a block diagram showing an example of an internal configuration of the main body apparatus 2. In addition to the components shown in FIG. 1, the main body apparatus 2 includes various components 81 to 85 and 91 shown in FIG. 2. Some of these components 81 to 85 and 91 may be accommodated in a housing 11 while being implemented as electronic parts on an electronic circuit substrate.

The main body apparatus 2 includes the display 12. The display 12 displays an image generated by the main body apparatus 2. In the exemplary embodiment, the display 12 is a liquid crystal display device (LCD). The display 12, however, may be a display device of any type.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

The main body apparatus 2 includes a processor 81. The processor 81 is an information processing section for executing various types of information processing to be executed by the main body apparatus 2. For example, a processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage medium (e.g., an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot 23. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17 and the right terminal 21. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. As described above, in the exemplary embodiment, the main body apparatus 2 can perform both wired communication and wireless communication with each of the left controller 3 and the right controller 4.

Further, the display 12 is connected to the processor 81. The processor 81 displays a generated image (e.g., an image generated by executing the above information processing) and/or an externally acquired image on the display 12.

Figure 3:
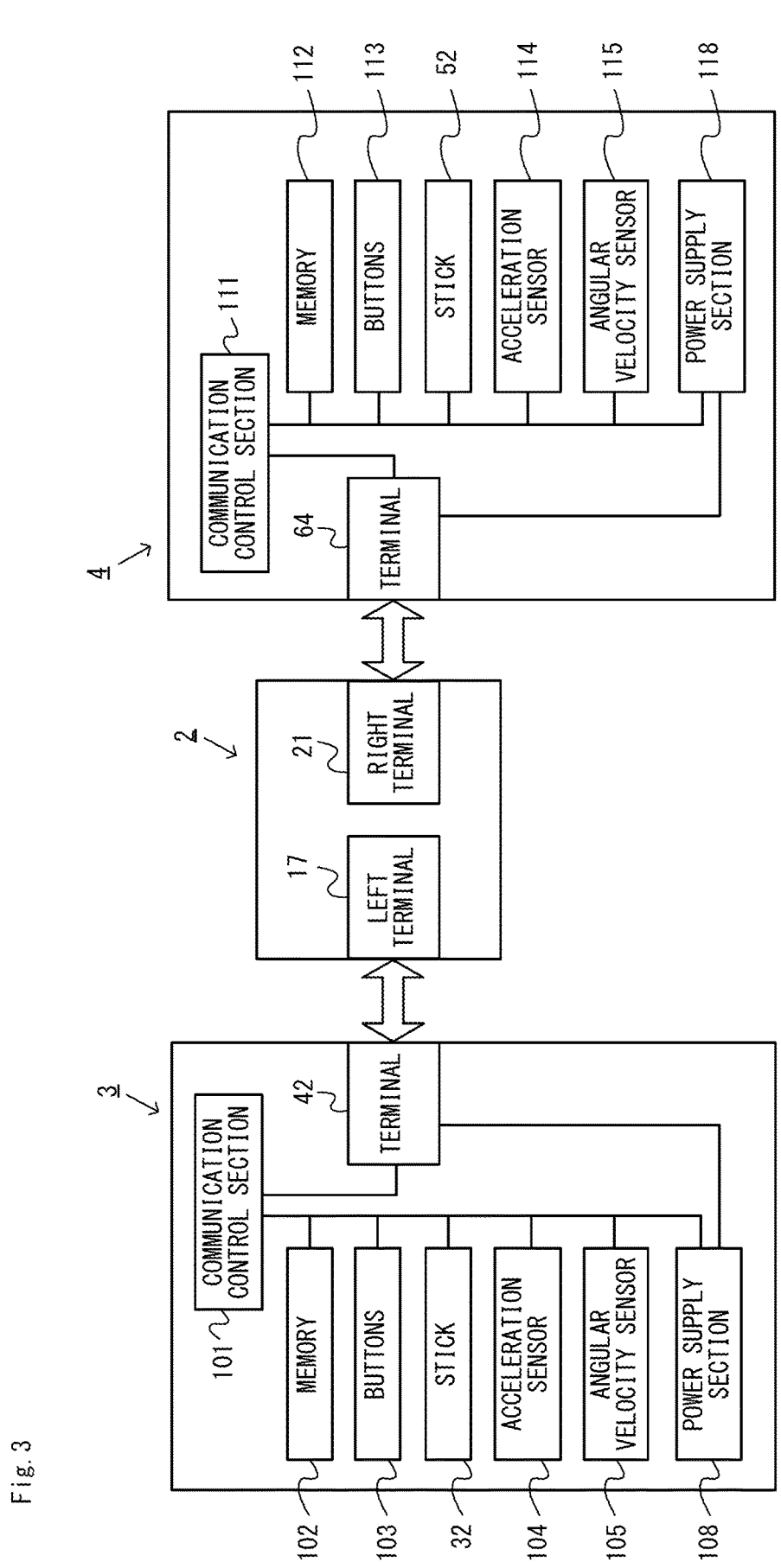
FIG. 3 is a block diagram showing an example of an internal configuration of a non-limiting main body apparatus, a non-limiting left controller and a non-limiting right controller.

FIG. 3 is a block diagram showing examples of the internal configurations of the main body apparatus 2, the left controller 3, and the right controller 4. It should be noted that the details of the internal configuration of the main body apparatus 2 are shown in FIG. 2 and therefore are omitted in FIG. 3.

The left controller 3 includes a terminal 42 for the left controller 3 to perform wired communication with the main body apparatus 2. The left controller 3 includes a communication control section 101, which communicates with the main body apparatus 2. As shown in FIG. 3, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83).

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes one or more buttons 103. Further, the left controller 3 includes the analog stick ("stick" in FIG. 3) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and, the inertial sensors). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operation of moving the left controller 3 and operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

Figure 7:
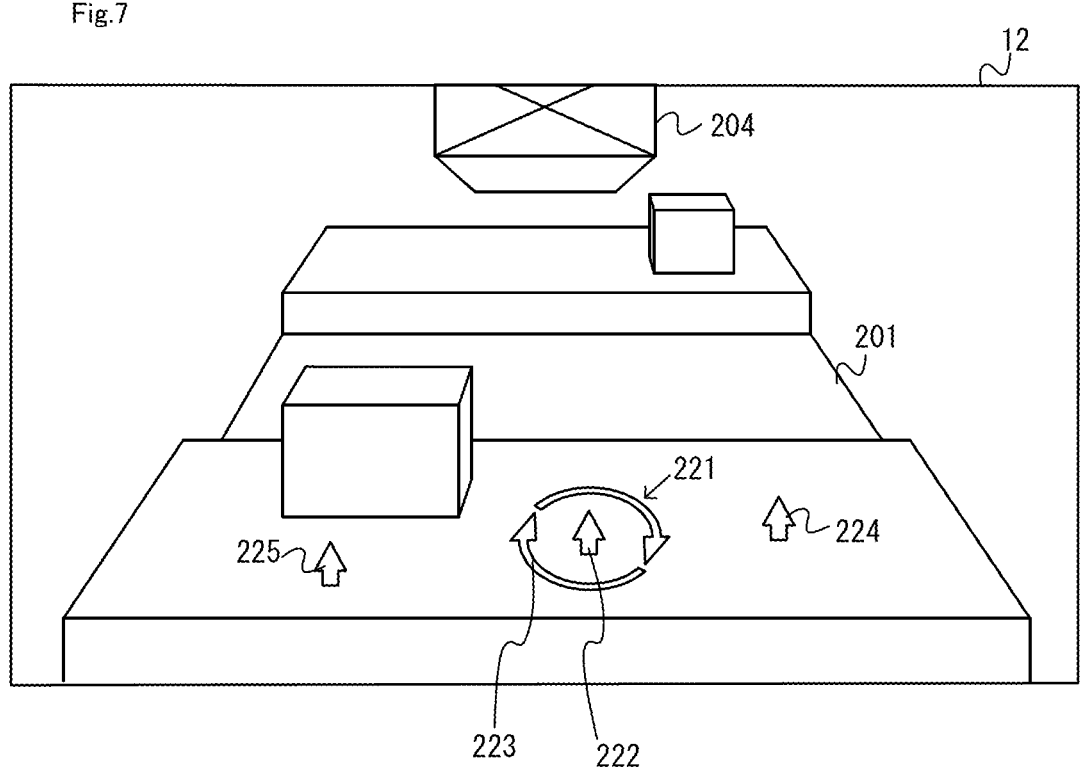
FIG. 7 is a view showing an example of a game image displayed when the player object is in the ready-to-eject state.

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, an acceleration sensor 114 and an angular velocity sensor 115. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

2. Outline of Processes Performed on Game System

Next, referring to FIG. 4 to FIG. 10, processes to be executed on the game system 1 will be outlined. In the present embodiment, the game system 1 executes a game in which a plurality of players fight against a plurality of players. Specifically, the game system 1 executes a game in which a player object, teammate objects and enemy objects appear on the game stage in game space, which is a three-dimensional virtual space. The player object is an object (e.g., a game character) that is controlled by the player using the game system 1. A teammate object is an object that is controlled by a player (referred to as a "teammate player") who is a teammate of the player. An enemy object is an object that is controlled by a player (referred to as an "enemy player") who is an enemy of the player. Teammate players and enemy players are players who use other game systems that communicate with the game system 1. In the present embodiment, the game system 1 executes the fighting game by communicating with the other game systems. Note that the player object, teammate objects and enemy objects will hereinafter be referred to collectively as "playable objects".

2-1. Game Space

Figure 4:
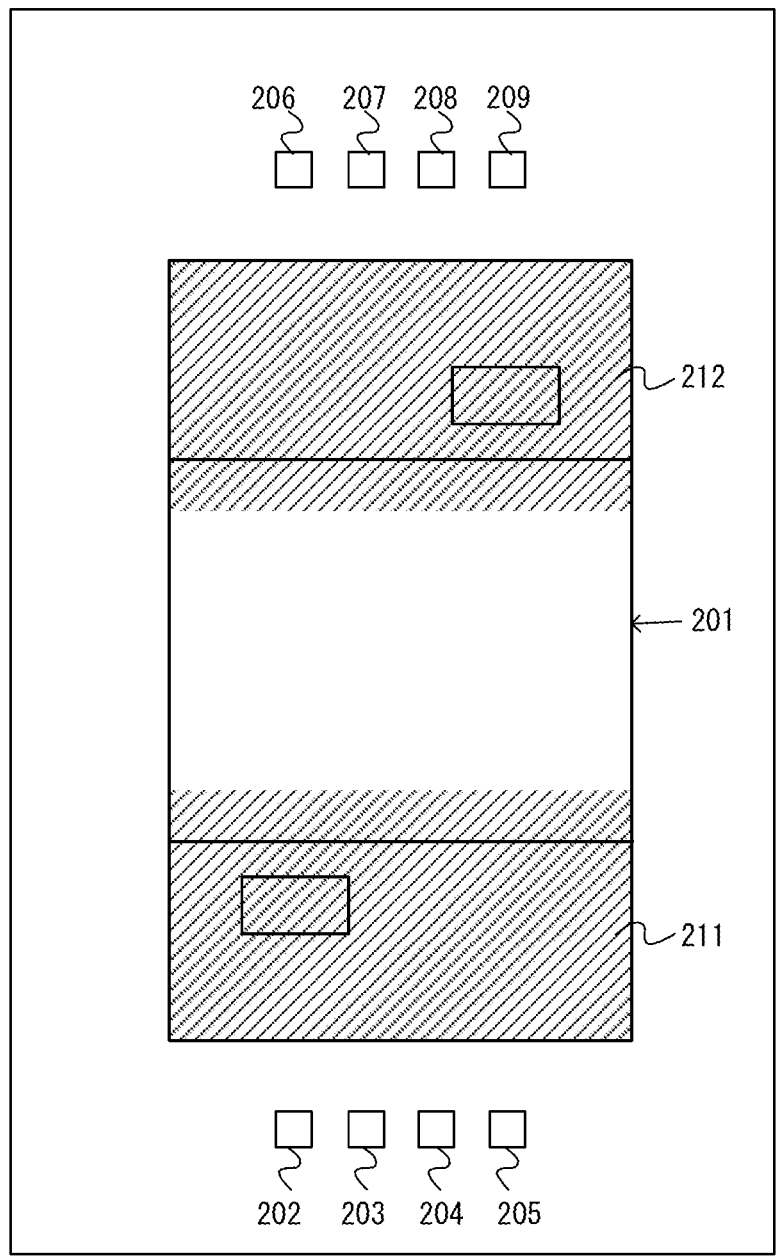
FIG. 4 is a diagram showing an example of a non-limiting game space.

FIG. 4 is a diagram showing an example of a game space. FIG. 4 shows the game space as viewed from above. As shown in FIG. 4, in the present embodiment, a game stage 201 is set in the game space. There is no limitation on the content of the game to be played on the game stage 201. For example, in the present embodiment, on the game stage 201, a playable object performs an action of attacking, for example, a playable object of the opponent (i.e., an enemy object for a player object or a teammate object, and a player object or a teammate object for an enemy object).

As shown in FIG. 4, stand-by objects 202 to 209 are arranged in the game space at positions different from the game stage 201. In the present embodiment, a playable object is arranged at a stand-by position on a stand-by object at the start of the game or when an exit condition is satisfied on the game stage 201. During the game, a playable object can return onto the game stage 201 by moving from the stand-by position onto the game stage 201.

In the present specification, moving from the stand-by position onto the game stage may be referred to as a "return". In the present specification, a "return" refers both to moving from the stand-by position onto the game stage after having exited from the game stage during the game and to initially moving from the stand-by position onto the game stage at the start of the game.

A stand-by position is a position different from a position on the game stage. In the present embodiment, the game system 1 does not allow a playable object to perform a predetermined action or actions at the stand-by position from among a plurality of actions that the playable object is able to perform on the game stage, (in other words, the predetermined action or actions is or are prohibited while at the stand-by position). For example, in the present embodiment, a playable object is not allowed to move or attack other playable objects while at the stand-by position. Thus, the stand-by position can be said to be a position that is different from the game stage and where a predetermined action or actions for playing the fighting game cannot be performed. In the present embodiment, a playable object while at the stand-by position is invincible to attacks by other playable objects. Thus, the stand-by position can be said to be a position that is different from the game stage and where a playable object is not susceptible to predetermined actions performed by other playable objects for playing the fighting game.

In the present embodiment, each playable object has a different stand-by position. As shown in FIG. 4, stand-by objects are arranged in the game space corresponding to the playable objects including the player object. In the present embodiment, there are eight playable objects including the player object, and there are eight stand-by objects 202 to 209 arranged corresponding to the playable objects. Note that in the present embodiment, the stand-by objects 202 to 205 corresponding to the player object and teammate objects are arranged on one side of the game stage 201 (on the lower side in FIG. 4), and the stand-by objects 206 to 209 corresponding to the enemy objects are arranged on the other side of the game stage 201 (on the upper side in FIG. 4). Thus, a stand-by object corresponding to a playable object that is to be the opponent of a playable object of a user may be arranged on the opposite side of the game stage 201 from a stand-by object corresponding to the playable object of the user. Note that in other embodiments, the stand-by position may be any position, and the stand-by position may be set, for example, on the inner side of a circular game stage (i.e., at the position of a hole on the inner side of the circle). As will be described below, the stand-by position may be a common position for all the playable objects.

In the present embodiment, the game stage 201 is shaped symmetric between one side and the other side. In the example shown in FIG. 4, the game stage 201 is symmetric (specifically, in point symmetry) with respect to the reference point, which is the central position of the game stage 201. The stand-by objects 202 to 205 corresponding to the player object and the teammate objects and the stand-by objects 206 to 209 corresponding to the enemy objects are arranged in symmetry with respect to the reference point, as is the game stage 201. Thus, it is possible to reduce the possibility of inequality in the game for the positions of the stand-by objects between the two teams. Note that in other embodiments, the game stage 201 may be shaped in line symmetry with respect to a symmetric axis, wherein the stand-by objects 202 to 205 and the stand-by objects 206 to 209 may be arranged in line symmetry with respect to the symmetric axis. In other embodiments, there is no limitation on the shape of the game stage, and it may be a non-symmetric shape.

As shown in FIG. 4, in the present embodiment, ejectable areas (hatched areas in FIGS. 4) 211 and 212 are set on the game stage 201. Although the details will be described below, in the present embodiment, a playable object can return onto the game stage 201 by being ejected from the stand-by object (referred to as "ejection move"). An ejectable area is an area that can be specified as the target (i.e., the destination) of the ejection move of a playable object.

In the present embodiment, the ejectable area 211 is for the player object and the teammate objects, and the ejectable area 212 is for the enemy objects. Thus, in the present embodiment, the ejectable area 211 for the player object and the teammate objects and the ejectable area 212 for the enemy objects are set separately from each other. Specifically, the ejectable area 211 is set on the same side of the game stage 201 as the stand-by objects 202 to 205 corresponding to the player object and the teammate objects (i.e., on the side closer to the stand-by objects 202 to 205). The ejectable area 212 is set on the same side of the game stage 201 as the stand-by objects 205 to 209 for the enemy objects (i.e., on the side closer to the stand-by objects 205 to 209). The ejectable area 211 and the ejectable area 212 are set in symmetry with respect to the reference point on the game stage 201. Thus, it is possible to reduce the possibility of inequality in the game for the positions to which playable objects return between the two teams. Note that in other embodiments, where the game stage 201 is shaped in line symmetry with respect to a symmetric axis, the ejectable area 211 and the ejectable area 212 may be set in line symmetry with respect to the symmetric axis.

As described above, in the present embodiment, areas on the game stage 201 to which playable objects can move through an ejection move are limited to the ejectable areas. Now, if a playable object is allowed to ejection move toward any position within the game stage 201, it may be too difficult for other players to predict the destination of the ejection move, thereby detracting from the playability. In contrast, in the present embodiment, it is possible to reduce such a possibility by limiting the areas to which playable objects can move through an ejection move.

As described above, in the present embodiment, the ejectable area 211 for the player object and the teammate objects and the ejectable area 212 for the enemy objects are different areas from each other. That is, the ejectable area 211 and the ejectable area 212 each include a portion that does not overlap with the other. Note that "each including a portion that does not overlap with the other" means to include embodiments in which the two areas do not at all overlap with each other, and embodiments in which the two areas partially overlap with each other. Thus, it is possible to ensure a good strategic aspect of the game with the variety of return positions while ensuring a good playability by keeping it relatively easy to predict positions to which playable objects can return. Thus, it is possible to improve the balance between the playability and the strategic aspect regarding the return onto the game stage.

Note that in other embodiments, there is no limitation on how the ejectable areas are set. For example, a common ejectable area may be set for playable objects, or a different ejectable area may be set for each playable object.

2-2. Return onto Game Stage at Start of Game

Figure 5:
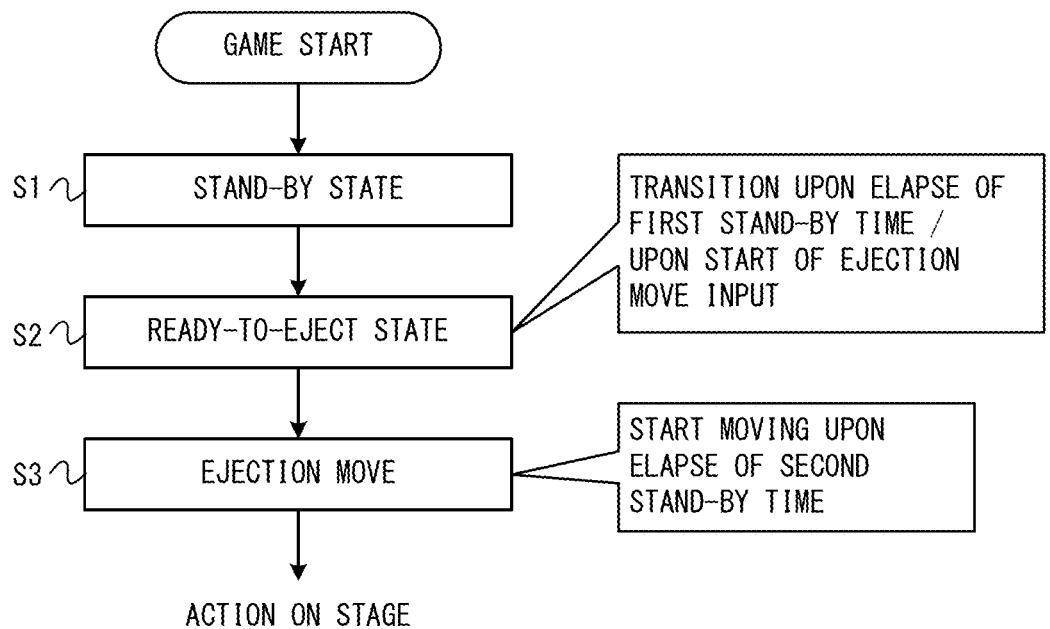
FIG. 5 is a diagram showing an example of how the state of the player object transitions when the player object returns onto the game stage at the start of the game.

FIG. 5 is a diagram showing an example of how the state of the player object transitions when the player object returns onto the game stage at the start of the game. As shown in FIG. 5, when the game is started, the player object is first in the stand-by state where the player object is arranged at the stand-by position described above (step S1). After the stand-by state, the player object transitions to the ready-to-eject state where the player object is ready to perform an ejection move from the stand-by position toward the game stage 201 (step S2). After the ready-to-eject state, the player object performs an ejection move of moving from the stand-by position toward the game stage 201 (step S3). Through the ejection move, the player object is arranged on the game stage 201. The process in which the player object returns from the stand-by position onto the game stage 201 at the start of the game will now be described.

Figure 6:
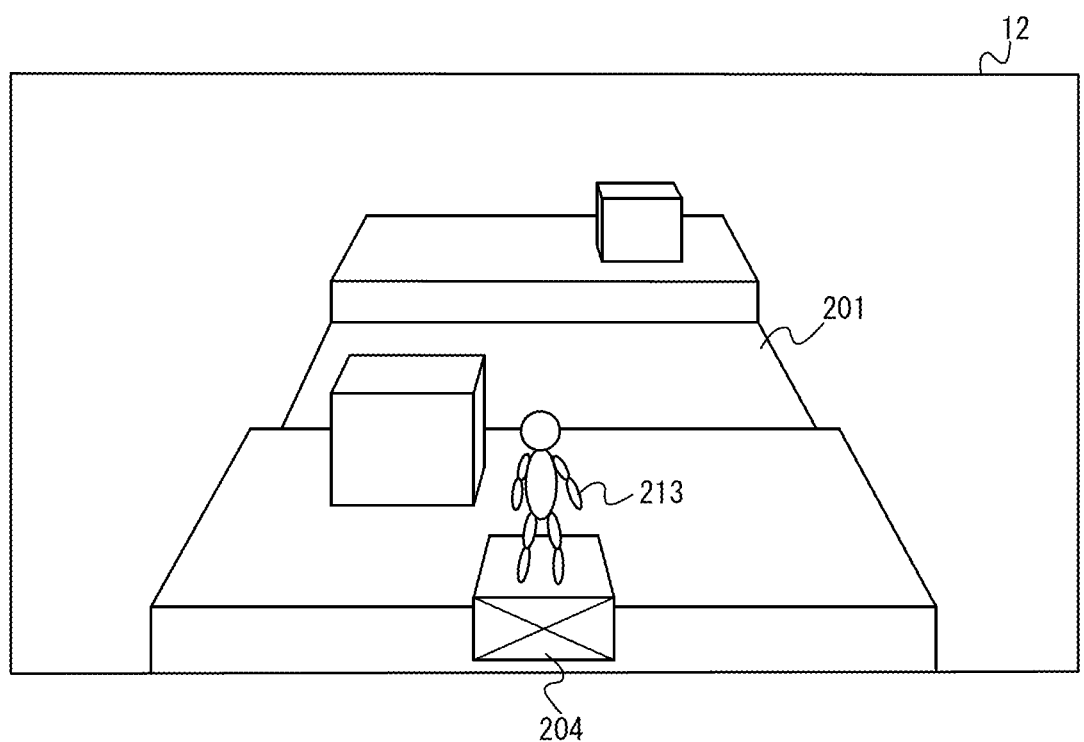
FIG. 6 is a view showing an example of a game image displayed when the player object is in the stand-by state.

FIG. 6 is a view showing an example of a game image displayed when the player object is in the stand-by state. In the stand-by state, the game system 1 displays, on the display 12, an image of the game space as viewed from a viewpoint of a bird's-eye position where the game stage 201 is viewed from above. In the stand-by state, the image of the game space includes a portion of the game stage 201 and a player object 213 on the stand-by object 204 (see FIG. 6). Note that in the present embodiment, the stand-by object 204, from among the stand-by objects 202 to 209 shown in FIG. 4, corresponds to the player object 213.

While in the stand-by state described above, when the transition condition for the transition to the ready-to-eject state is satisfied, the player object transitions to the ready-to-eject state. In the present embodiment, the transition condition is elapse of a first stand-by time (e.g., 5 seconds) since the transition to the stand-by state or the player making an input similar to an ejection move input (the details thereof will be described below) (see FIG. 5). Note that "an input similar to an ejection move input" refers to an input performed on the same input section as the ejection move input. For example, where an ejection move input is an input performed on an analog stick of the controller, an input similar to an ejection move input is an input performed on the analog stick. Note that an input similar to an ejection move input does not need to be an input that functions as an ejection move input (i.e., an input by which the game system 1 executes a process in response to an ejection move input).

FIG. 7 is a view showing an example of a game image displayed when the player object is in the ready-to-eject state. Also in the ready-to-eject state, as in the stand-by state, the game system 1 displays, on the display 12, an image of the game space as viewed from a viewpoint of a bird's-eye position where the game stage 201 is viewed from above. Note that in the present embodiment, in response to the transition of the player object 213 from the stand-by state to the ready-to-eject state, the game system 1 displays a special effect image showing the player object 213 moving into the stand-by object 204 (this is similarly done also for the other playable objects). At this point, the attitude of the stand-by object 204 is controlled so as to be oriented in the ejection direction (i.e., the direction of the game stage 201, more specifically, the direction toward a designated position to be described below). In the ready-to-eject state, a game image that includes a portion of the game stage 201 and a portion of the stand-by object 204 is displayed so that the viewpoint is close to that when the game space is viewed from the stand-by object 204 (see FIG. 7). Thus, the bird's-eye position may vary between the stand-by state and the ready-to-eject state.

As shown in FIG. 7, in the ready-to-eject state, a designated position marker 221 that represents a designated position on the game stage 201 is displayed, together with the game stage 201, on the display 12. The designated position is a position to be the target of the ejection move described above. In the ready-to-eject state, the game system 1 accepts an input for moving the designated position as an input (referred to as an ejection move input) for ejecting the player object 213. For example, an ejection move input is a direction specifying input made on the analog stick of the controller. Note that in the present embodiment, the ready-to-eject state ends upon elapse of a second stand-by time (e.g., 3 seconds) since the transition to the ready-to-eject state (see FIG. 5). When the ready-to-eject state ends, the player object performs an ejection move toward the designated position at the end of the ready-to-eject state.

In the ready-to-eject state, the game system 1 sets a virtual camera so that at least a portion of the ejectable area 211 corresponding to the player object is displayed (see FIG. 4 and FIG. 7). Thus, it is possible to present a game image such that the player can easily perform an ejection move input. Note that there is no need for the entirety of the ejectable area 211 to be displayed. For example, a portion of the ejectable area 211 that is hidden by an obstacle on the game stage 201 does not need to be displayed.

In the present embodiment, the game system 1 controls the movement of the designated position marker 221 so that the designated position marker 221 never specifies a position in the game space that is different from the game stage 201. Specifically, when the designated position marker 221 moves from a position on the game stage 201 in the direction toward the outside of the game stage 201, the game system 1 stops the movement of the designated position marker 221 at the boundary of the game stage 201. Note that "a position that is different from the game stage" refers to, for example, a position where it is not possible to control the movement of the player object based on an input by the player and/or a position where the player object is considered "exited". With the rectangular game stage 201 as shown in FIG. 4, for example, it refers to a position outside the rectangular shape. In a case where there is an area (e.g., a hole or a pond) inside the game stage such that a playable object, fallen therein, is considered "exited", a position within such an area is "a position that is different from the game stage". Thus, the game system 1 prohibits a position where it is not possible to control the movement of the player object based on an input by the player from being a designated position that is specified by an ejection move input. Then, it is possible to reduce the possibility that a position that is not appropriate becomes the designated position as a result of an erroneous operation by the player. Note that in other embodiments, the game system 1 may control the movement of the designated position marker so that the designated position marker can specify a position that is different from the game stage 201.

The game system 1 controls the movement of the designated position marker 221 so as to specify a position within the ejectable area 211 corresponding to the player object 213 (i.e., so as not to specify a position outside the ejectable area 211). Specifically, when the designated position marker 221 moves from a position within the ejectable area 211 in the direction toward the outside of the ejectable area 211, the game system 1 stops the movement of the designated position marker 221 at the boundary of the ejectable area 211. Then, it is possible to prevent the designated position marker 221 from specifying a position where an ejection move is impossible, and it is possible to improve the controllability regarding the movement of the designated position marker 221.

As shown in FIG. 7, the designated position marker 221 includes a cursor 222 and a ring 223. The cursor 222 is arranged at the designated position described above. The ring 223 has a ring shape and is arranged parallel to the ground of the game stage 201 so as to surround the cursor 222. In the present embodiment, the game system 1 changes the size (i.e., the diameter) of the ring 223 so that the size gradually decreases over time after the start of the ready-to-eject state. More specifically, at the end of the ready-to-eject state, the size of the ring 223 becomes substantially zero. Thus, according to the present embodiment, it is possible to help the player recognize, based on the size of the ring 223, the amount of time elapsed since the start of the ready-to-eject state (in other words, the amount of time remaining until the end of the ready-to-eject state).

In the present embodiment, the ring 223 is displayed to be spinning in the circumferential direction, and the ring 223 has such a shape that the spin can be recognized by the player (specifically, a shape that includes an arrow representing the direction of spin). Thus, the game system 1 can display the ring 223 in such a way that the ring 223 can be seen easily. For example, when the color of the ground of the game stage 201 changes during the game (e.g., when the ground is given a color as a result of an attack by a playable object), the designated position marker 221 cannot be seen easily depending on the color of the ground, and it may become difficult for the player to recognize the designated position. In contrast, according to the present embodiment, since the ring 223 is displayed to be spinning, the player can easily recognize the designated position even in such a case.

According to the present embodiment, the game system 1 displays designated position markers (e.g., designated position markers 224 and 225 shown in FIG. 7) representing designated positions for teammate objects in addition to the designated position marker 221 representing the designated position for the player object 213. That is, when a designated position specified by an ejection move input by a teammate player is included within a range of the game stage 201 that is displayed on the display 12, the game system 1 displays the designated position marker representing the designated position on the display 12. Then, the player can know the position at which the teammate object is to return onto the game stage 201. Therefore, in the present embodiment, the player can strategically return by, for example, determining the return position of the player object 213 while taking into consideration the return position of a teammate object, for example. Thus, it is possible to improve the strategic aspect of the game when the player object 213 returns onto the game stage 201.

In the present embodiment, the cursors 222, 224 and 225 are each a three-dimensional object that is arranged along the ground of the game stage 201 slightly above the ground. Then, although how the cursor is seen varies depending on whether the virtual camera for generating the game image is arranged at the bird's-eye position described above or arranged at a position based on the player object 213 on the game stage 201, it is possible to display the cursor in an easy-to-see manner in either case.

Note that in the present embodiment, the designated position marker for a teammate object includes a cursor but does not include a ring. Then, the player can easily distinguish between the designated position for the player object and the designated position marker for a teammate object. Note that in other embodiments, the designated position marker for a teammate object may be shaped so as to include a cursor and a ring.

In the present embodiment, the game system 1 does not display the designated position marker for an enemy object. Here, the game system 1 also causes an enemy object to exit from and return onto the game stage 201, as with the player object 213. That is, the game system 1 causes an enemy object to exit from the game stage 201 at least when the enemy object satisfies an exit condition as a result of an attack by the player object or a teammate object. When a condition is satisfied (specifically, when an ejection move input is to be performed by an enemy player) after the enemy object exits from the game stage, the enemy object returns based on a designated position that is specified by the ejection move input. Then, even when the designated position that is specified by the ejection move input by the enemy player is included in a range of the game stage 201 that is displayed on the display 12, the game system 1 does not display an image representing the designated position (specifically, an object representing the designated position marker is not arranged in the game space). Then, since the player cannot predict the return position of the enemy object, it is difficult to attack in ambush the enemy object upon return onto the game stage 201, for example. Then, it will not be too disadvantageous for a playable object returning onto the game stage 201. Note that in the present embodiment, on the game system of the enemy player, the designated position marker for the enemy object is displayed while designated position markers for the player object 213 and teammate objects are not displayed. This ensures equality between players of the player's team (i.e., the player and teammate players) and players of the enemy team (i.e., enemy players).

Note that in other embodiments, the game system 1 may display only the designated position marker for the player object 213 or may display designated position markers for enemy objects in addition to designated position markers for teammate objects.

When the ejection start condition is satisfied while in the ready-to-eject state, the player object 213 performs an ejection move. In the present embodiment, the ejection start condition is elapse of the second stand-by time (e.g., 3 seconds) since the transition to the ready-to-eject state. That is, the player can make an ejection move input until elapse of the second stand-by time since the transition to the ready-to-eject state, and the player object 213 starts an ejection move upon elapse of the second stand-by time.

As described above, when a predetermined input (specifically, an input similar to an ejection move input) is made by the player while in the stand-by state, or when the first stand-by time elapses, the game system 1 transitions to a designated position setting state (specifically, a ready-to-eject state) in which the designated position is set by the ejection move input, and the return of the player object 213 is started upon elapse of the second stand-by time since the transition. Thus, the player can vary the timing for the player object 213 to return onto the game stage 201 based on whether to perform a predetermined input while in the stand-by state or to stand by until elapse of the first stand-by time. This gives a strategic aspect to the timing for returning onto the game stage 201, thereby improving the playability of the game.

Note that in other embodiments, there is no limitation on the transition condition for transitioning from the stand-by state to the ready-to-eject state, and there is no limitation on the ejection start condition for starting the ejection move from the ready-to-eject state. For example, the ejection move of the player object is started even if there is no instruction from the player upon elapse of the second stand-by time since the transition to the ready-to-eject state in the present embodiment, whereas the ejection move of the player object may be started in response to an instruction from the player in other embodiments. For example, in other embodiments, the game system 1 may transition the player object from the stand-by state to the ready-to-eject state in response to a predetermined input by the player, or may cause the player object to start the ejection move in response to an input to start an ejection move made by the player.

Figure 8:
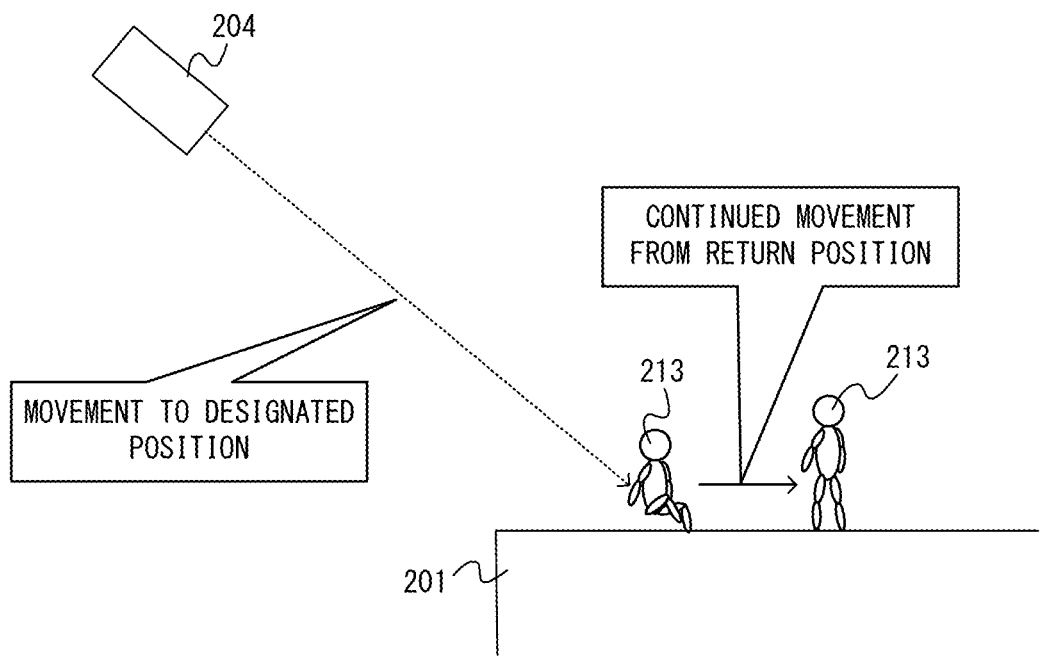
FIG. 8 is a view showing an example of an ejection move.

FIG. 8 is a view showing an example of the ejection move. As shown in FIG. 8, in the ejection move, the player object 213 first moves from the stand-by object 202 toward the designated position. Note that in the present embodiment, the player object 213 moves from the stand-by object 202 straight toward the designated position (see the dotted arrow shown in FIG. 8). For example, for an ejection move, the game system 1 shows a special effect image showing the player object 213 being ejected from the stand-by object 202.

In the present embodiment, during a period in which the player object 213 is performing an ejection move, the game system 1 accepts an input by the player for changing the moving direction of the player object 213. When an input is made during this period, the game system 1 changes the moving direction of the player object 213, which is being ejected, in accordance with the input. Thus, when the player object 213 returns based on the designated position specified by the ejection move input, the game system 1 moves the player object 213 from a position that is different from the game stage 201 (i.e., the stand-by position) toward the designated position, and changes the moving direction of the player object 213 based on an input by the player while moving. Thus, even when the circumstances in the game change (e.g., when an enemy object has moved close to the designated position) during an ejection move, the player can adjust the position to which the player object 213 returns depending on the circumstances in the game. Note that in other embodiments, during the period in which the player object 213 is performing an ejection move, the game system 1 may not accept an input by the player for changing the moving direction of the player object 213.

As described above, in the present embodiment, the position on the game stage 201 to which the player object 213 actually returns may be a position different from the designated position that is specified by the ejection move input. For example, in some cases, due to an input by the player during an ejection move, the player object 213 may return to a position that is slightly shifted from the designated position (therefore, the player object 213 may move to a position different from the game stage 201 by an ejection move, and may possibly fall off the game stage 201). Before reaching the designated position during an ejection move, the player object 213 may change its moving direction by hitting an obstacle on the game stage 201 (e.g., a wall), thereby returning to a position that is different from the designated position. As described above, the position on the game stage 201 to which the player object 213 actually returns does not need to coincide with the designated position but it may be a position at which the player object 213 arrives on the game stage 201 as a result of moving based on the designated position.

The game system 1 may set an upper limit to the amount of change (e.g., the amount of change per unit time) in the moving direction of the player object 213 during an ejection move. Then, the position on the game stage 201 to which the player object 213 returns can be prevented from being a position that is significantly away from the designated position.

As shown in FIG. 8, in the present embodiment, when the player object 213 returns onto the game stage 201 through an ejection move, the player object 213 continues to move (this is referred to as "continued move"). The continued move is done at a predetermined speed over a predetermined continued move time in a direction that is determined as a component of the moving direction when returning onto the game stage 201 that is parallel to the ground. As the continued move, the game system 1 causes the player object 213 to move as if the player object 213 slipped with the momentum of landing onto the game stage 201 through an ejection move, for example. This makes more natural the series of actions of returning through an ejection move.

Here, in the present embodiment, the ground of the game stage 201 may be in a state where it is advantageous for the player's team, a state where it is advantageous for the opponents' team, and in a neutral state. These states can be changed during the game. For example, the player object 213 and the teammate objects can transition the state of the ground of the game stage 201 to a state where it is advantageous for the player's team through an attack action or an action of using an item. The enemy objects can transition the state of the ground of the game stage 201 to a state where it is advantageous for the opponents' team through an attack action or an action of using an item. Within an area where it is advantageous for the player's team, the player object 213 can perform a high-speed-move of moving faster than normal. On the other hand, in an area where it is advantageous for the opponents' team, the player object 213 cannot perform the high-speed-move described above, and the moving speed of the normal move decreases (as compared with that in an area where it is advantageous for the player's team).

As described above, in the present embodiment, while the player object 213 is not in the continued move, there may be a restriction on the movement of the player object 213 being influenced by the state of the ground. In contrast, during the continued move, the player object 213 can move without being influenced by the state of the ground. That is, even in an area where it is advantageous for the opponents' team, the player object 213 can perform the continued move at the predetermined speed. Note that the predetermined speed is higher than the moving speed of the normal move.

As described above, in the present embodiment, an unrestricted area (e.g., an area where it is advantageous for the player's team) and a restricted area (e.g., an area where it is advantageous for opponents' team) where the movement of the player object is more restricted than in the unrestricted area are set by the game system 1 on the game stage. Then, when the player object 213 returns based on the designated position that is specified by the ejection move input, the game system 1 controls the movement of the player object 213 without the restriction of the restricted area even if the player object 213 is located in the restricted area until elapse of a predetermined continued move time since the return. Thus, during the continued move time after returning onto the game stage 201, the player object 213 can perform the continued move irrespective of the position to which the player object 213 has returned. This makes it easier for the player to perform a move operation immediately after the return, thereby improving the controllability of the game.

Note that in other embodiments, there is no limitation on whether or not the player object 213 performs a continued move and the specific content of the continued move. For example, in other embodiments, the game system 1 does not need to cause the player object 213 to perform a continued move, or may cause the player object 213 to perform a continued move taking into consideration restrictions of the restricted area.

In the present embodiment, during a period in which the player object 213 is performing a continued move, the game system 1 accepts an input by the player for changing the moving direction of the player object 213. If such an input is made during this period, the game system 1 changes the moving direction of the player object 213 during a continued move, in accordance with the input. Thus, the player can adjust the moving direction of the player object 213 even during a continued move. Note that the game system 1 may set an upper limit on the amount of change in the moving direction of the player object 213 during a continued move.

In the present embodiment, when the player object 213 returns onto the game stage 201 through an ejection move, the game system 1 sets the player object 213 in an empowered state for the period of the empower time. The empowered state is a state where the player object 213 is empowered in some way in the game. The empowered state can be said to be a state where the player object 213 is less likely to satisfy the exit condition based on which the player object 213 is forced to exit from the game stage 201. In the present embodiment, the empowered state is a state where the defense of the player object against enemy objects is empowered compared with the reference state (i.e., the state reached upon elapse of the empower time). There is no limitation on the specific effect deriving from the empowered state, which for example may be the effect of nullifying a certain amount of attacks from enemy objects, the effect of boosting the defense level, or the effect of nullifying attacks from enemy objects during the empower time.

As described above, in the present embodiment, when the player object 213 returns based on the designated position that is specified by the ejection move input, the game system 1 gives the player object 213 the effect in the game whereby the exit condition for the player object 213 is less likely to be satisfied until elapse of a predetermined empower time since the return as compared with after the end of the period. Thus, it is possible to reduce the possibility that the exit condition is satisfied immediately after the return (e.g., attacked by an enemy object immediately after the return). Note that in other embodiments, the game system 1 does not need to give the player object 213 the effect described above when the player object 213 returns onto the game stage 201 through an ejection move. In other embodiments, the game system 1 may give the player object 213 the effect described above even when the player object 213 returns onto the game stage 201 through a jump move to be described below.

Note that the length of the continued move time and the length of the empower time may be equal to or different from each other. The continued move time may be longer than or shorter than the empower time.

Note that in the present embodiment, when a teammate object satisfies the exit condition, the game system 1 causes the teammate object to exit from the game stage 201, and when a teammate object exits from the game stage 201 and then an ejection move input is made by the teammate player, the game system 1 causes the teammate object to return based on the designated position that is specified by the ejection move input at a position within the same ejectable area 211 as the player object 213. Thus, in the present embodiment, the same ejectable area is set for the playable objects of the player's team (i.e., the player object and teammate objects). Then, it is possible to prevent a significant inequality for the return onto the game stage 201 from occurring between players of the player's team.

On the other hand, in the present embodiment, a different stand-by position is set for each playable object. That is, when the player object 213 has exited from the game stage 201, the game system 1 arranges the player object 213 at a first stand-by position that is different from the game stage 201 (e.g., the position of the stand-by object 204 shown in FIG. 4), whereas when a teammate object has exited from the game stage 201, the game system 1 arranges the teammate object at a second stand-by position that is different from the game stage 201 and is also different from the first stand-by position (e.g., the position of the stand-by object 202, 203, 205 shown in FIG. 4). Thus, it is possible to vary the environment for returning onto the game stage 201 between playable objects of the player's team including the player object 213. Then, it is possible to improve the strategic aspect regarding the return onto the game stage 201, as will be described below, for example.

For example, where a predetermined object to be an obstacle (e.g., a wall) is present on the game stage 201, if a playable object hits the predetermined object while moving to the designated position, the game system 1 causes the playable object to return to a position that is different from the designated position. Here, when each playable object has a different stand-by position, as in the present embodiment, the influence of an obstacle when returning also varies for each playable object. Therefore, for example, when the player wishes to arrange the playable objects of the player's team on the game stage 201 so as not to be close to each other, the player can predict a position to which it is difficult for teammate objects to return from their stand-by positions so as to control so that the player object returns to such a position. For example, in order to protect a teammate object who is returning, the player can predict a position to which the teammate object is likely to return so as to move the player object to such a position. Thus, by varying the stand-by position of each playable object, it is possible to create various strategies in the game and improve the strategic aspect of the game.

Note that in other embodiments, there may be a common stand-by position for all the playable objects, or there may be a common stand-by position for playable objects of the player's team and a common stand-by position for playable objects of the opponents' team.

2-3. Return to Game Stage During Game

Next, a process to be performed when a playable object who has exited from the game stage during the game returns onto the game stage will be described. In the present embodiment, when a playable object satisfies an exit condition, the playable object is forced to temporarily exit from the game stage 201. Note that while there is no limitation on exit conditions, the exit conditions are as follows in the present embodiment.

a playable object being defeated by an attack by an enemy object.
 a playable object falling out of the game stage 201.
 a playable object performing a jump move with the destination being the stand-by position (the details will be described below).

When any of the conditions is satisfied, the game system 1 causes the playable object to exit from the game stage 201 and arranges the playable object at the stand-by position described above. Then, the playable object can return onto the game stage 201 from the stand-by position. The process in which the player object 213 returns onto the game stage 201 during the game as described above will be described below.

Figure 9:
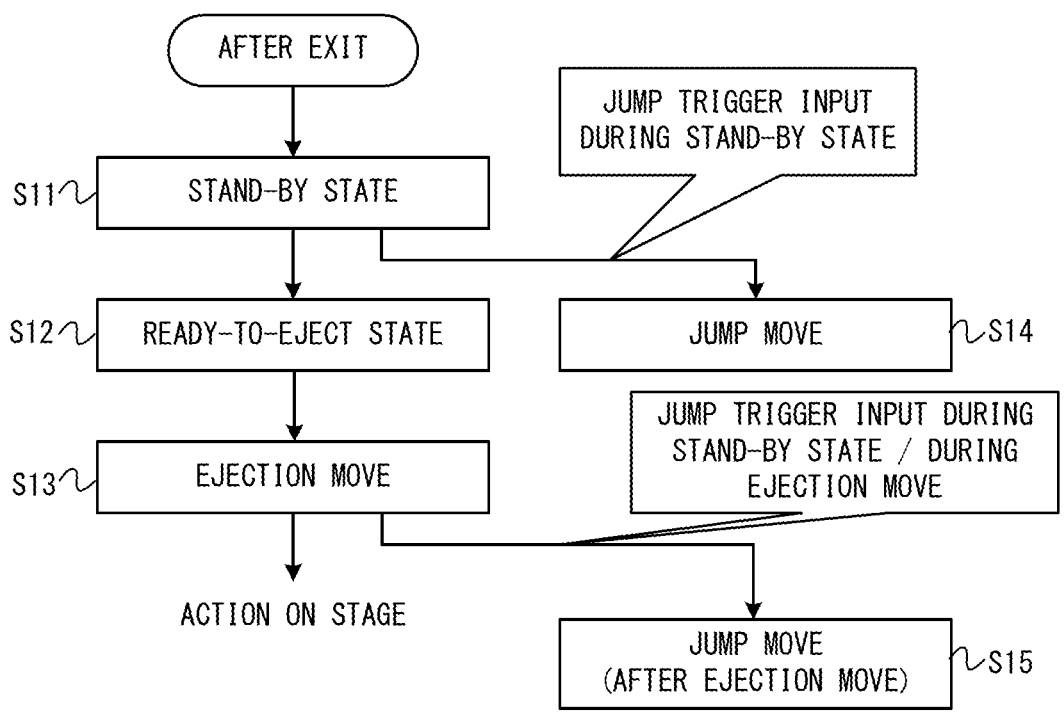
FIG. 9 is a view showing an example of how the state of the player object transitions when the player object returns onto the game stage during the game.

FIG. 9 is a view showing an example of how the state of the player object transitions when the player object returns onto the game stage during the game. Also when the player object 213 exits during the game, as is the case at the start of the game, the player object 213 is in the stand-by state (step S11). That is, when the player object 213 exits during the game, the player object 213 is arranged at the stand-by position.

Also when the player object 213 exits during the game, as is the case at the start of the game, the player object 213 can return onto the game stage 201 through an ejection move. That is, when the player object 213 transitions to the ready-to-eject state after the stand-by state (step S12), the player object 213 performs an ejection move toward the designated position that is specified by an ejection move input by the player after the end of the ready-to-eject state (step S13). Note that the same input method is used for an ejection move input at the start of the game and after the player object 213 exits during the game.

In the present embodiment, when the player object 213 exits during the game, the player object 213 can perform a jump move in addition to an ejection move. A jump move is a move in which the player object 213 jumps high and then drops onto a position that is specified by the player. Thus, in the present embodiment, when the player object 213 exits during the game, the player can cause the player object 213 to return onto the game stage 201 through a jump move as well as cause the player object 213 to return onto the game stage 201 through an ejection move.

The game system 1 accepts an input for causing the player object to perform a jump move (referred to as a "jump move input") for a period from the transition to the stand-by state until the completion of the ejection move (i.e., until the player object 213 returns onto the game stage 201). Note that during this period, the player can either make a jump move input without making an ejection move input or make a jump move input after making an ejection move input in the ready-to-eject state.

In the present embodiment, a jump move input includes a series of inputs, including a map display input, a cursor move input and a jump trigger input. The map display input is an input for an instruction to display a map image of the game stage 201 on the display 12. That is, when a map display input is made by the player, the game system 1 displays the map image on the display 12.

Figure 10:
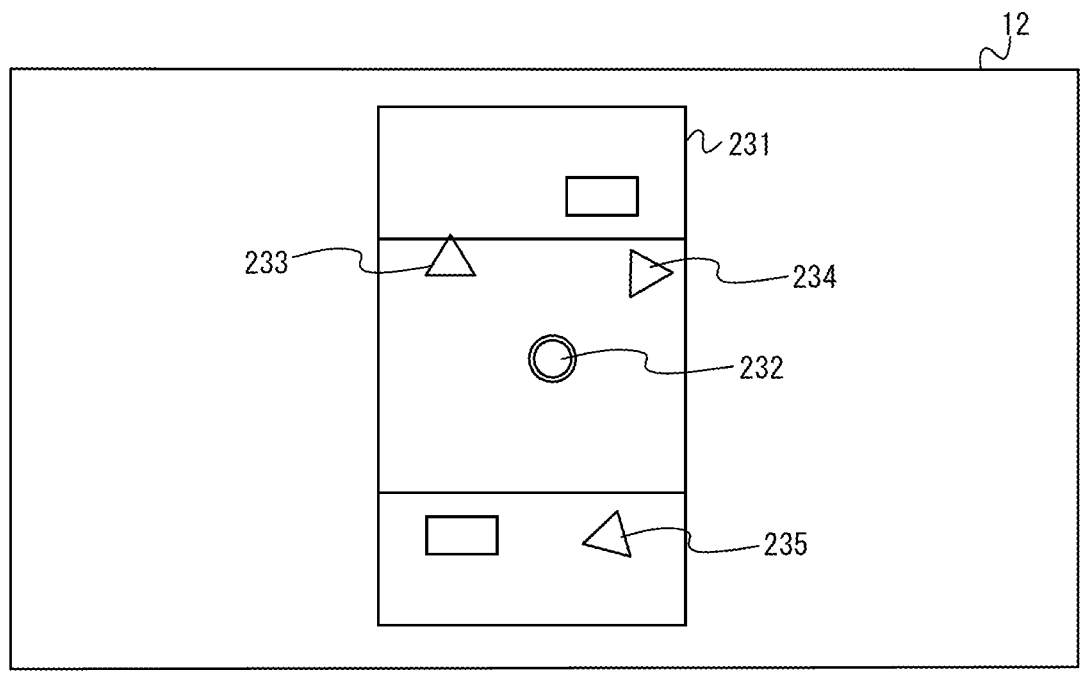
FIG. 10 is a diagram showing an example of a map image displayed on a display.

FIG. 10 is a diagram showing an example of the map image displayed on the display. As shown in FIG. 10, the map image includes a stage image 231 representing the game stage 201, a cursor 232, and the teammate markers 233 to 235 representing the positions of the teammate objects. Note that the game system 1 may further display, in association with the teammate markers 233 to 235, the names of the teammate players corresponding to the teammate objects.

The cursor 232 represents the designated position that is specified as the destination of the jump move. While the map image is displayed, the game system 1 accepts the cursor move input for moving the cursor 232 on the map image.

In the present embodiment, the game system 1 accepts, as the cursor move input, an input for moving the cursor 232 to the position of one of the teammate markers 233 to 235. For example, up, left and right of a cross-shaped key of the controller may each be assigned to a different teammate marker, and in response to an input of up, left or right, the cursor 232 may be moved to the position of the teammate marker that is associated with the input.

In the present embodiment, the game system 1 accepts, as the cursor move input, an input where the stand-by position is the designated position. For example, the stand-by position may be set as the designated position when an input of down is made on the cross-shaped key of the controller.

Note that there is no limitation on the specific input method for the cursor move input. The game system 1 may move the cursor 232 up, down, left or right on the map image in accordance with the operation of changing the attitude of the controller or the direction specifying input on the analog stick of the controller, for example.

Note that the position that can be specified as the designated position in a jump move is not limited to positions in the ejectable area of the game stage 201. That is, for a jump move, the player can specify, as the designated position, even a position outside the ejectable area.

In a state where the map image is displayed, the game system 1 accepts a jump trigger input for instructing to execute a jump move. When a jump trigger input is made, the game system 1 causes the player object 213 to perform a jump move based on the designated position represented by the cursor 232 (specifically, with the destination being the designated position) at the point in time when a jump trigger input is made.

Here, when a jump trigger input is made while in the stand-by state, the game system 1 causes the player object 213 to perform a jump move without putting the player object 213 in the ready-to-eject state (step S14 shown in FIG. 9). That is, in such a case, the player object 213 performs a jump move from a position on the stand-by object 204 to the designated position. In this case, the player object 213 returns onto the game stage 201 through a jump move instead of an ejection move.

As described above, in the present embodiment, the game system 1 causes the player object 213 to return based on the designated position that is specified by a jump move input, which is the position of a predetermined movement target object (an object other than the player object) arranged on the game stage 201. Here, in the present embodiment, the movement target object is a teammate object. Thus, for example, a teammate player can arrange a teammate object at a position that is advantageous in the game so that the player can return to the position of the teammate object. Thus, in the present embodiment, since the player can play the game advantageously by cooperating with a teammate player regarding the return of the player object, it is therefore possible to improve the strategic aspect regarding the return onto the game stage 201.

Note that in other embodiments, the movement target object whose position is specified by a jump move input is not limited to a teammate object but may be any object. For example, in other embodiments, the movement target object may be an object of a particular item arranged on the game stage 201 by a playable object, or may be an object of a particular item that is arranged in advance on the game stage at the start of the game.

As described above, in the present embodiment, when the player object 213 is in the stand-by state, the player can cause the player object 213 to return onto the game stage 201 by two methods, i.e., an ejection move and a jump move. Here, in the present embodiment, an ejection move and a jump move are different from each other as specified in (a) to (f) below.

(a) As described above, the designated position can be specified only in the ejectable area for an ejection move, whereas the designated position can be specified without being limited to the ejectable area for a jump move.

(b) As described above, for an ejection move, the designated position marker for an enemy object is not displayed on the display 12. On the other hand, for a jump move, the game system 1 displays the marker representing the designated position of the jump move on the display 12, irrespective of whether the playable object performing the jump move is an object of the player's team or an object of the opponents' team. That is, when a designated position of a jump move by an enemy object is included in a range of the game stage 201 that is displayed on the display 12, the game system 1 displays a marker representing the designated position. Therefore, it can be said that for a jump move, the destination of the jump move may possibly be known by an opponent player, and that the possibility of the player object 213 being targeted by an enemy object immediately after the move is higher than an ejection move. Note that the game system 1 does not need to display markers for all the jump moves on the display 12. For example, the game system 1 may display the marker when a playable object performs a jump move by specifying, as the designated position, the position of another playable object of the same team, and may not display the marker when a playable object performs a jump move by specifying, as the designated position, the position of an object other than a playable object (e.g., an object of the particular item described above).

(c) As described above, in an ejection move, a continued move is performed following the return of the player object 213 onto the game stage 201. In contrast, in a jump move, a continued move is not performed following the return of the player object 213 onto the game stage 201 through a jump move. Therefore, it can be said that the player object 213 can be moved more easily following the return in an ejection move than in a jump move.

(d) As described above, for an ejection move, the player object 213 transitions to the empowered state after returning onto the game stage 201. In contrast, for a jump move, the player object 213 does not transition to the empowered state after returning onto the game stage 201. Therefore, it can be said that the player object 213 is less likely to satisfy the exit condition after the return in an ejection move than in a jump move.

(e) As described above, for an ejection move, it is possible to make an input for changing the moving direction of the player object 213 during the move. In contrast, for a jump move, the game system 1 does not accept an input for changing the moving direction of the player object 213 during the move.

(f) As described above, for an ejection move, the player object 213 moves from the stand-by position straight toward the designated position (see FIG. 8). In contrast, for a jump move, the player object 213 moves in a parabola. Thus, an ejection move and a jump move differ from each other in the manner of movement of the player object 213.

As described above, a jump move is more advantageous in the game than an ejection move for (a) above, but is more disadvantageous in the game than an ejection move for (b) to (e) above. Thus, in the present embodiment, as the method for returning the player object 213 onto the game stage 201, there are two different methods with different advantages in the game. Thus, the player causes the player object 213 to return onto the game stage 201 by selecting one of the two methods while taking into consideration circumstances in the game, etc., and it is therefore possible to improve the strategic aspect regarding the return.

Note that in other embodiments, the differences between an ejection move and a jump move are not limited to (a) to (f) above. For example, in other embodiments, an ejection move and a jump move may differ from each other for only some of the points (a) to (f) above, while not differing from each other for the other points. An ejection move and a jump move may further differ from each other for the points other than (a) to (f) above.

As described above, when the player object 213 returns based on the designated position that is specified by an ejection move input, the game system 1 moves the player object 213 in a manner of movement different from that when returning the player object 213 based on the designated position that is specified by a jump move input. Then, players can easily recognize the manner of movement, between the two different methods, in which the player object 213 is moving. Note while the player object 213 is described to move straight in an ejection move in the present embodiment, the player object 213 does not need to move along a strictly straight line. For example, the game system 1 may cause the player object 213 to perform an ejection move while gradually changing the moving direction slightly downward during the move taking into consideration the influence of gravity in the game space, for example. Also in this way, the manner of movement may differ between an ejection move and a jump move as in the present embodiment. In other embodiments, the manner of movement for the return may be the same for the two methods. Note that "the manner of movement of an object being different" means that the manner of movement includes various differences that can be recognized by the player. For example, "the manner of movement of an object being different" means that the path of movement of an object is different as in the present embodiment, that the moving speed is different, that the appearance of the object during the move is different, etc.

Note that in the present embodiment, the user interface for specifying the designated position for an ejection move (see FIG. 7) and the user interface for specifying the designated position for a jump move (see FIG. 10) are different from each other. That is, the game system 1 displays the image representing the designated position (that is, the designated position marker 221) superimposed over the image of the game stage 201 in the game space for an ejection move, whereas the game system 1 displays the image representing the designated position (that is, the cursor 232) superimposed over the map image representing the game stage 201 for a jump move. Therefore, in the present embodiment, the player can clearly recognize whether the player is making an input specifying the designated position for an ejection move or for a jump move.

As shown in FIG. 9, in the present embodiment, if a jump trigger input is made after the end of the stand-by state (that is, during the ready-to-eject state or during the ejection move), the game system 1 causes the player object 213 to perform an ejection move (step S13) before performing a jump move (step S15). That is, the player object 213 performs an ejection move (step S13) following the ready-to-eject state (step S12 shown in FIG. 9), and further performs a jump move (step S15) after the ejection move. Specifically, in the present embodiment, the player object 213 returns onto the game stage 201 through an ejection move, thereafter performs a continued move as described above, and then performs a jump move following the continued move. Note however that in other embodiments, the player object 213 may return onto the game stage 201 through an ejection move, and then perform a jump move following the ejection move without performing a continued move. In other embodiments, the player object 213 may perform a jump move following the end of the empowered state described above.

Note that in the present embodiment, at the start of the ready-to-eject state, the game system 1 sets the designated position at a predetermined initial position even if there is no ejection move input by the player. Therefore, the player object 213 performs an ejection move (based on the designated position set at the initial position) upon elapse of the second stand-by time even if there is no ejection move input in the ready-to-eject state. Therefore, in the present embodiment, even when the player does not perform an ejection move input during a period from the start of the stand-by state to the end of the ready-to-eject state, the player object 213 performs an ejection move, and performs a jump move following the ejection move if a jump trigger input has been made during this period.

As described above, in the present embodiment, if a jump move input is performed during the period of an ejection move (that is, the period since the start of the return of the player object in response to an ejection move input until the return of the player object), the game system 1 moves the player object based on the designated position that is specified by the jump move input. Then, the player object 213 can be moved significantly to another position immediately after the return, thereby increasing the variety of strategies that can be employed by the player after the return, thus improving the strategic aspect of the game. For example, it is assumed that the player may wish to change the return position when circumstances in the game change after performing an ejection move input or when the designated position has been specified incorrectly. According to the present embodiment, in such a case, the player can substantially change the return position of the player object 213.

Note that as described above, in the present embodiment, not only when a jump move input (more specifically, a jump trigger input) is made during the period of an ejection move but also when a jump move input is made during the period of the ready-to-eject state, the game system 1 moves the player object based on the designated position that is specified by the jump move input. As is apparent from this, the phrase "when a jump move input is made during the period of an ejection move, the player object is moved based on the designated position that is specified by the jump move input" means that the player object is moved when a jump move input is made at least during the period of an ejection move, and does not exclude a case where the player object is moved when a jump move input is performed in other periods as well as during the period of an ejection move. Note that in other embodiments, the game system 1 may perform the move described above when a jump move input is made during the period of an ejection move, while not performing the move described above when a jump move input is made during the period of the ready-to-eject state.

Note that in the present embodiment, when a jump move input is made during the period since the ejection move input until the player object returns, the game system 1 causes the player object 213 to first perform an ejection move and then perform a jump move. In contrast, in other embodiments, in the case described above, the game system 1 may cause the player object 213 to perform a jump move without performing an ejection move.

In the present embodiment, the player object 213 can perform a jump move not only at the stand-by position but also on the game stage 201. That is, the game system 1 accepts the jump move input even when the player object 213 is arranged on the game stage 201, and causes the player object 213 to perform a jump move when a jump move input is made by the player. As described above, when the player object 213 is arranged on the game stage 201, it is possible to perform a jump move to the stand-by position from the position on the game stage 201.

Note that in the present embodiment, when the player object 213 performs a jump move following an ejection move, as compared with a case where a jump move other than this is performed (that is, when it is not a jump move following an ejection move), the jump move starts earlier. Specifically, the game system 1 sets the amount of time since the completion of the jump move input (that is, since a jump trigger input is made) until the player object 213 starts the jump move for the former case to be shorter than the amount of time since the completion of the jump move input until the player object 213 starts the jump move for the latter case. For example, for a jump move, if a player object performs a jump action following a preliminary action, the amount of time for the preliminary action for the former case is set shorter than that for the latter case. Then, when the player object 213 performs a jump move following an ejection move, the player can more quickly change the position of the player object 213.

3. Specific Example of Processes Performed on Game System

Next, referring to FIG. 11 to FIG. 15, specific examples of information processes performed on the game system 1 will be described.

Figure 11:
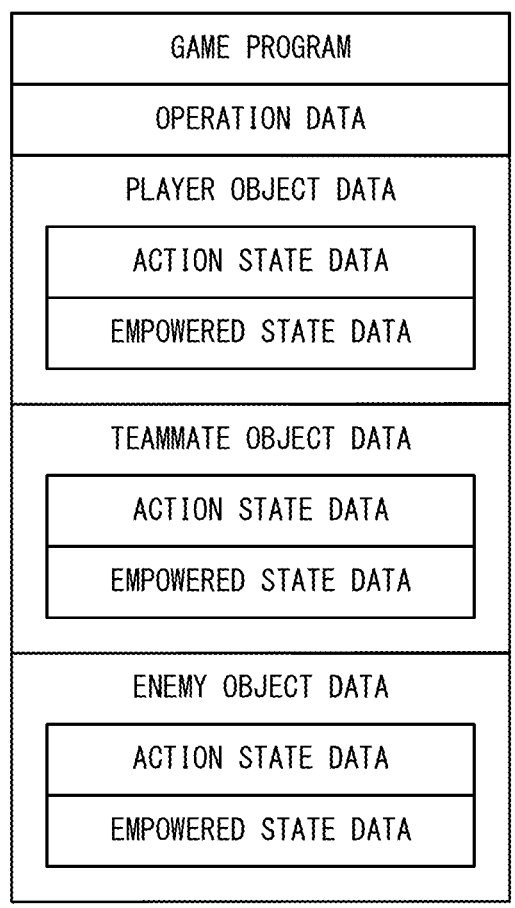
FIG. 11 is a diagram showing an example of various data used in information processes performed on a non-limiting game system.

FIG. 11 is a diagram showing an example of various data used in information processes performed on the game system 1. The various data shown in FIG. 11 are stored in a storage medium that can be accessed by the main body apparatus 2 (e.g., the flash memory 84, the DRAM 85 and/or a memory card attached to the slot 23, etc.).

As shown in FIG. 11, the game system 1 stores a game program. The game program is a game program for executing a game process of the present embodiment (specifically, the game process shown in FIG. 12). That is, as the game system 1 executes the game program, processes of the steps of the game process are executed. The game system 1 stores operation data, player object data, teammate object data and enemy object data.

The operation data is data representing operations performed by players playing the game (that is, the players controlling the playable objects). In the present embodiment, the operation data includes input data representing inputs made on the input sections described above.

The player object data represents the state of the player object. In the present embodiment, the player object data includes action state data and empowered state data. The action state data represents the state regarding the action of the player object (e.g., the stand-by state, the ready-to-eject state, etc., described above). The empowered state data represents the state regarding the action of the player object (e.g., whether or not the player object is in the empowered state described above).

The teammate object data represents the state of the teammate object. The teammate object data includes action state data representing the state regarding the action of the teammate object and empowered state data representing the state regarding the empowerment of the teammate object. Note that although not shown in the figures, the teammate object data is stored for each of the teammate objects appearing in the game.

The enemy object data represents the state of the enemy object. The enemy object data includes action state data representing the state regarding the action of the enemy object and empowered state data representing the state regarding the empowerment of the enemy object. Note that although not shown in the figures, the enemy object data is stored for each of the enemy objects appearing in the game.

Figure 12:
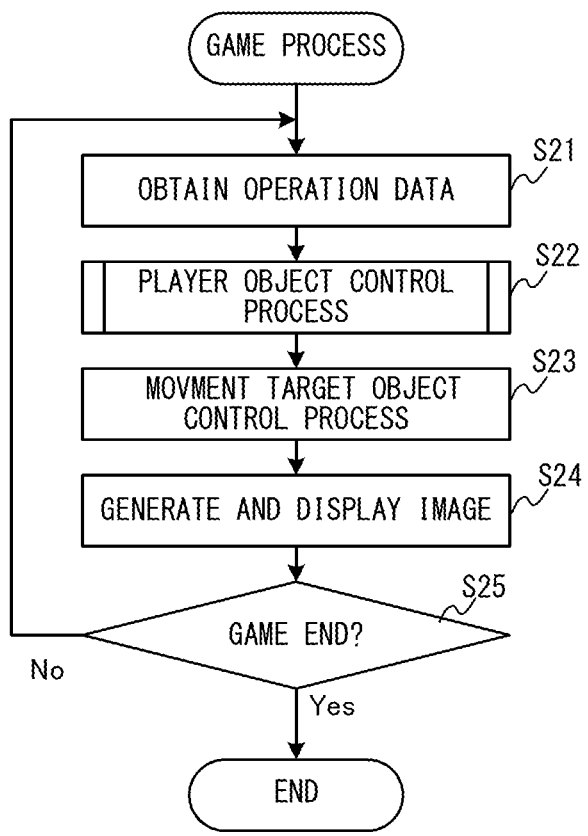
FIG. 12 is a flow chart showing an example of a flow of a game process executed by a non-limiting game system.

FIG. 12 is a flow chart showing an example of the flow of the game process executed by the game system 1. The game process shown in FIG. 12 is started in response to an instruction to start the game given by the player during the execution of the game program.

Note that in the present embodiment, it is assumed that the processor 81 of the main body apparatus 2 executes the processes of the steps shown in FIG. 12 by executing the game program stored in the game system 1. Note however that in other embodiments, some of the processes of the steps may be executed by another processor (e.g., a dedicated circuit) different from the processor 81. When the game system 1 can communicate with another information processing apparatus (e.g., a server), some of the processes of the steps shown in FIG. 12 to FIG. 15 may be executed on the other information processing apparatus. The processes of the steps shown in FIG. 12 to FIG. 15 are merely illustrative, and the order of steps to be performed may be switched around or other processes may be executed in addition to (or instead of) the processes of the steps, as long as similar results are obtained.

The processor 81 executes the processes of the steps shown in FIG. 12 to FIG. 15 using a memory (e.g., the DRAM 85). That is, the processor 81 stores information (in other words, data) obtained in each process step in the memory, and when the information is used in a subsequent process step, the information is read out from the memory and used.

In step S21 shown in FIG. 12, the processor 81 obtains operation data for each player. Here, the operation data for the player of the game system 1, from among the players, is transmitted from the controllers 3 and 4 to the main body apparatus 2 as described above. The operation data is received by the controller communication section 83 and stored in the storage medium such as the DRAM 85. Operation data for the other players (that is, teammate players and enemy players) of game systems different from the game system 1, from among the players, are transmitted from the game systems of the other players to the game system 1. The operation data is received by the network communication section 82 and stored in the storage medium such as the DRAM 85. The processor 81 reads out the operation data for the players from the storage medium. The process of step S22 is executed, following step S21.

In step S22, the processor 81 executes a player object control process. The player object control process is a process of controlling the action of the player object based on the operation by the player. In the player object control process, the processor 81 causes the player object to perform an ejection move or a jump move described above, for example, or causes the player object to perform an attack action against other playable objects. The details of the player object control process will be described below. The process of step S23 is executed, following step S22.

In step S23, the processor 81 executes a movement target object control process. The movement target object control process is a process of controlling the action of a teammate object or an enemy object based on the operation by the teammate player or the enemy player (e.g., an ejection move or a jump move described above or an attack action against other playable objects). The process of step S24 is executed, following step S23.

In step S24, the processor 81 generates a game image and displays the game image on the display 12. Specifically, the processor 81 generates an image representing the game space as viewed from the virtual camera. Note that there is no limitation on the specific method for controlling the virtual camera. In the present embodiment, when the player object is in the stand-by state and the ready-to-eject state, the processor 81 controls the virtual camera so as to generate images described in "[2-2. Return onto game stage at start of game]" above (see FIG. 6 and FIG. 7). When the player object is arranged on the game stage 201, the movement of the virtual camera is controlled in a manner such as to follow the movement of the player object. The phrase "a manner such as to follow the movement of the player object" refers both to an embodiment in which the movement of the virtual camera is controlled in a so-called first-person perspective and an embodiment in which the movement of the virtual camera is controlled in a so-called third-person perspective. Note that with either the first-person perspective embodiment or the third-person perspective embodiment, the position and/or the attitude of the virtual camera may be changed by the operation by the player, or the position and/or the attitude of the virtual camera may be changed based on the orientation of the player object. When the map display input described above is made, the processor 81 generates the map image described above and displays the map image on the display 12 (see step S61 to be described below).

Note that while the game system 1 displays an image on the display 12 in the present embodiment, an image may be displayed on another display device different from the display 12 (e.g., a monitor connected to the main body apparatus 2).

In the present embodiment, when the process loop of a series of steps S21 to S25 is repeatedly executed, the processor 81 executes the process of step S24 at a rate of once per a predetermined amount of time (e.g., one frame period). Thus, a game image showing how playable objects, etc., act in the game space is displayed. The process of step S25 is executed, following step S24.

In step S25, the processor 81 determines whether or not to end the game. For example, when a condition to end the game (e.g., elapse of the time limit or the game being over, etc.) is satisfied, or when an instruction to end the game is given by the player, the processor 81 determines to end the game. When the determination result of step S27 is affirmative, the processor 81 ends the game process shown in FIG. 12. On the other hand, when the determination result of step S25 is negative, the process of step S21 is executed again. Thereafter, the process loop of a series of steps S21 to S25 is repeatedly executed until it is determined to end the game in step S25.

Figure 13:
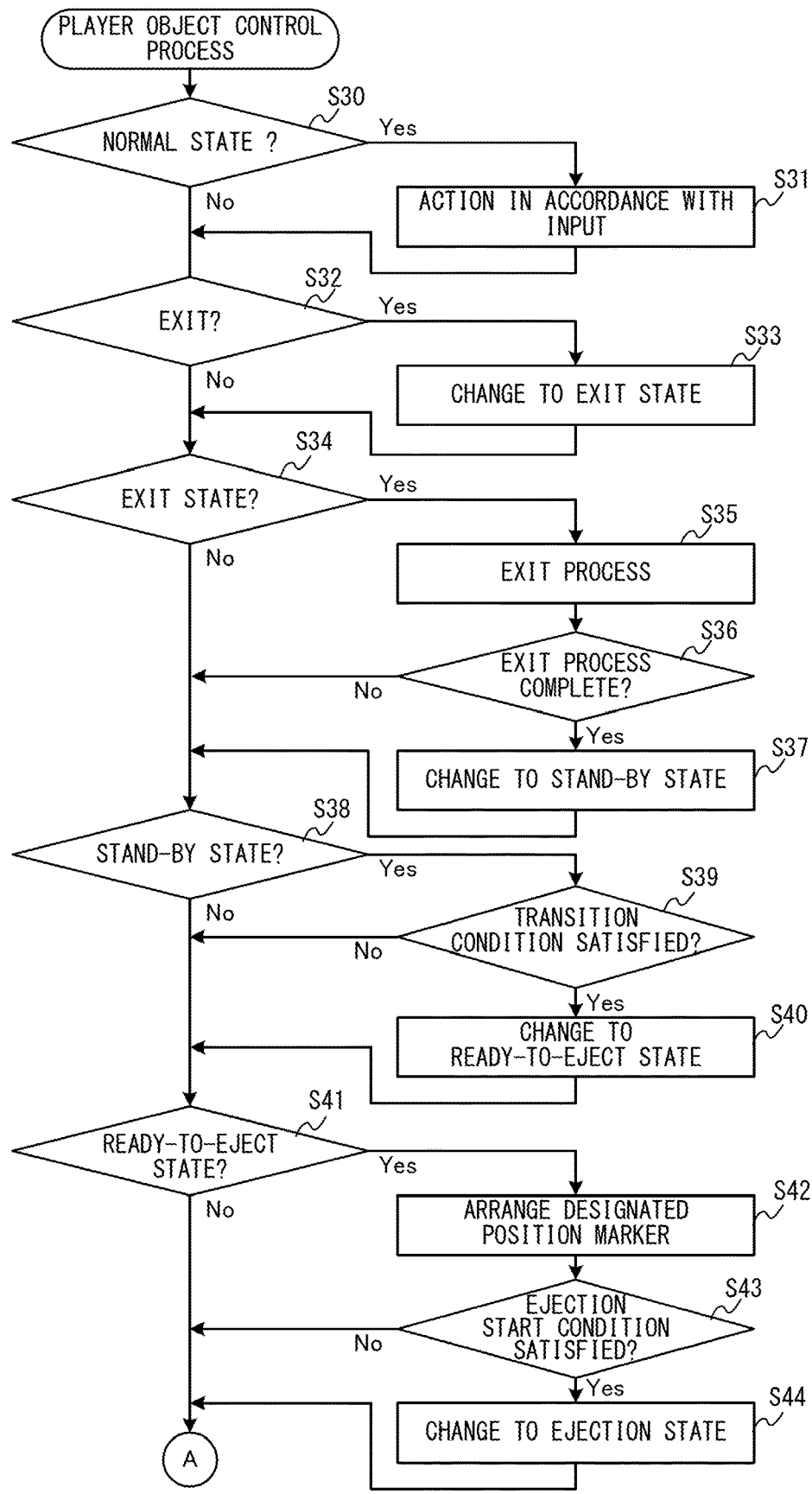
FIG. 13 is a sub-flow chart showing an example of a detailed flow of a player object control process shown in FIG. 12.
Figure 14:
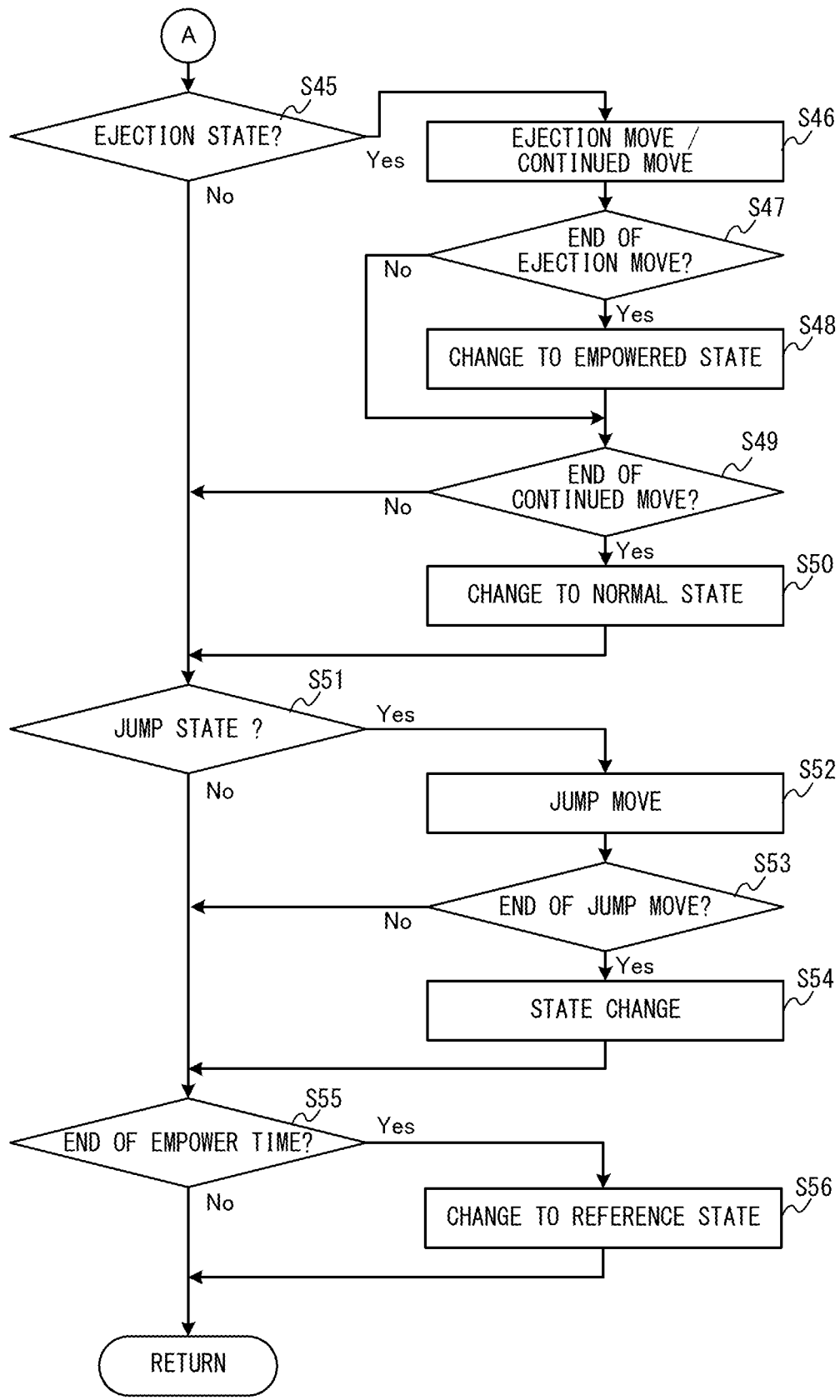
FIG. 14 is a sub-flow chart showing an example of a detailed flow of a player object control process shown in FIG. 12.

FIG. 13 and FIG. 14 are sub-flow charts showing an example of the detailed flow of the player object control process shown in FIG. 12. In the player object control process, first, in step S30, the processor 81 refers to the action state data of the player object data stored in the storage medium to determine whether the player object is in the normal state. The normal state refers to the state of the action of the player object being none of the stand-by state, the ready-to-eject state, the ejection state (that is, during the ejection move or the continued move), the jump state (that is, during the jump move) and the exit state. When the determination result of step S30 is affirmative, the process of step S31 is executed. On the other hand, when the determination result of step S30 is negative, the process of step S32 is executed.

In step S31, the processor 81 controls the player object so as to perform an action in accordance with an input by the player. For example, the processor 81 causes the player object to move based on a move input by the player or causes the player object to perform an attack action based on an attack input by the player. Note that the player object control process in the present embodiment is executed repeatedly at a rate of once per a predetermined amount of time (e.g., one frame period). Therefore, in a single iteration of the process of step S31 (this similarly applies to steps S35, S46 and S52 to be described below), the processor 81 causes the player object to act by the amount of action for the predetermined amount of time. For example, when the player object performs a move action, the processor 81 moves the player object by the amount of move for the predetermined amount of time. The process of step S32 is executed, following step S31.

In step S32, the processor 81 determines whether at least one player object satisfies the exit condition as a result of the processes of steps S22 and S23 having been executed thus far. When the determination result of step S32 is affirmative, the process of step S33 is executed. On the other hand, when the determination result of step S32 is negative, the process of step S34 is executed, skipping the process of step S33.

In step S33, the processor 81 changes the action state of the player object to the exit state. Specifically, the processor 81 updates the player object data stored in the storage medium so as to indicate the exit state. The process of step S34 is executed, following step S33.

In step S34, the processor 81 refers to the action state data of the player object data stored in the storage medium to determine whether the player object is in the exit state. When the determination result of step S34 is affirmative, the process of step S35 is executed. On the other hand, when the determination result of step S34 is negative, the process of step S38 to be described below is executed.

In step S35, the processor 81 performs the exit process of causing the player object to exit from the game stage. The exit process is a process of moving the player object to the stand-by position from a position on the game stage where the player object has satisfied the exit condition, for example. In the exit process, the player object does not need to be continuously moved to the stand-by position from the position where the player object has satisfied the exit condition, but the player object may be controlled to once disappear at the position where the player object has satisfied the exit condition and then reappear at the stand-by position. The process of step S36 is executed, following step S35.

In step S36, the processor 81 determines whether the exit process has been completed. Specifically, the processor 81 determines whether the movement of the player object to the stand-by position has been completed. When the determination result of step S36 is affirmative, the process of step S37 is executed. On the other hand, when the determination result of step S36 is negative, the process of step S38 is executed, skipping the process of step S37.

In step S37, the processor 81 changes the action state of the player object to the stand-by state. Specifically, the processor 81 updates the action state data of the player object data stored in the storage medium so as to indicate the stand-by state. The processor 81 arranges the player object at the stand-by position. The process of step S38 is executed, following step S37.

In step S38, the processor 81 refers to the action state data of the player object data stored in the storage medium to determine whether the player object is in the stand-by state. When the determination result of step S38 is affirmative, the process of step S39 is executed. On the other hand, when the determination result of step S38 is negative, the process of step S41 to be described below is executed.

In step S39, the processor 81 determines whether the transition condition for transitioning from the stand-by state to the ready-to-eject state (see "[2-2. Return onto game stage at start of game]" above). When the determination result of step S39 is affirmative, the process of step S40 is executed. On the other hand, when the determination result of step S39 is negative, the process of step S41 is executed, skipping the process of step S40.

In step S40, the processor 81 changes the action state of the player object to the ready-to-eject state. Specifically, the processor 81 updates the action state data of the player object data stored in the storage medium so as to indicate the ready-to-eject state. The processor 81 moves the player object into the stand-by object. The process of step S41 is executed, following step S40.

In step S41, the processor 81 refers to the action state data of the player object data stored in the storage medium to determine whether the player object is in the ready-to-eject state. When the determination result of step S41 is affirmative, the process of step S42 is executed. On the other hand, when the determination result of step S41 is negative, the process of step S45 to be described below is executed.

In step S42, the processor 81 arranges the object of the designated position marker (see FIG. 7) based on the ejection move input by the player. That is, the processor 81 determines the content of the ejection move input based on the operation data for the player obtained in step S21 so as to arrange the designated position marker at the position that is specified by the ejection move input. While in the ready-to-eject state, the process of step S42 is executed repeatedly so that the designated position marker moves in response to the ejection move input. The process of step S43 is executed, following step S42.

In step S43, the processor 81 determines whether the ejection start condition for starting an ejection move (see "[2-2. Return onto game stage at start of game]" above) is satisfied. When the determination result of step S43 is affirmative, the process of step S44 is executed. On the other hand, when the determination result of step S43 is negative, the process of step S45 is executed, skipping the process of step S44.

In step S44, the processor 81 changes the action state of the player object to the ejection state. The ejection state is a state in which the player object performs the ejection move or the continued move. Specifically, the processor 81 updates the action state data of the player object data stored in the storage medium so as to indicate the ejection state. The process of step S45 is executed, following step S44.

In step S45 shown in FIG. 14, the processor 81 refers to the action state data of the player object data stored in the storage medium to determine whether the player object is in the ejection state. When the determination result of step S45 is affirmative, the process of step S46 is executed. On the other hand, when the determination result of step S45 is negative, the process of step S51 to be described below is executed.

In step S46, the processor 81 causes the player object to perform an ejection move or a continued move. That is, the processor 81 causes the player object to perform an ejection move immediately after the transition to the ejection state, and causes the player object to perform a continued move after the completion of the ejection move. Note that the specific actions of the ejection move and the continued move are as described above in "[2-2. Return onto game stage at start of game]" above. The process of step S47 is executed, following step S46.

In step S47, the processor 81 determines whether the player object has completed the ejection move. When the determination result of step S47 is affirmative, the process of step S48 is executed. On the other hand, when the determination result of step S47 is negative, the process of step S49 is executed, skipping the process of step S48.

In step S48, the processor 81 changes the state regarding the empowerment of the player object to the empowered state. Specifically, the processor 81 changes the empowered state data of the player object data stored in the storage medium so as to indicate the empowered state. Thus, the player object transitions to the empowered state described above, and the defense of the player object against attacks from enemy objects is empowered. The process of step S49 is executed, following step S48.

In step S49, the processor 81 determines whether the player object has completed the continued move. When the determination result of step S49 is affirmative, the process of step S50 is executed. On the other hand, when the determination result of step S49 is negative, the process of step S51 is executed, skipping the process of step S50.

In step S50, the processor 81 changes the action state of the player object to the normal state. Specifically, the processor 81 updates the action state data of the player object data stored in the storage medium so as to indicate the normal state. The process of step S51 is executed, following step S50.

In step S51, the processor 81 refers to the action state data of the player object data stored in the storage medium to determine whether the player object is in the jump state. The jump state is a state where the player object performs the jump move described above. When the determination result of step S51 is affirmative, the process of step S52 is executed. On the other hand, when the determination result of step S51 is negative, the process of step S55 to be described below is executed.

In step S52, the processor 81 causes the player object to perform a jump move. The specific action of the jump move is as described in "[2-3. Return to game stage during game]" above. Note that the designated position, which is the destination of the jump move, is set in the jump control process (FIG. 15) to be described below. The process of step S53 is executed, following step S52.

In step S53, the processor 81 determines whether the player object has completed the jump move. When the determination result of step S53 is affirmative, the process of step S54 is executed. On the other hand, when the determination result of step S53 is negative, the process of step S55 is executed, skipping the process of step S53.

In step S54, the processor 81 changes the action state of the player object. Specifically, when the destination of the jump move is a position on the game stage 201, the processor 81 changes the action state of the player object to the normal state. When the destination of the jump move is the stand-by position described above, the processor 81 changes the action state of the player object to the stand-by state. In step SM, the processor 81 updates the action state data of the player object data stored in the storage medium so as to indicate the normal state or the stand-by state. The process of step S55 is executed, following step SM.

In step S55, the processor 81 determines whether the empower time described above has elapsed since the transition of the player object to the empowered state. When the determination result of step S55 is affirmative, the process of step S56 is executed. On the other hand, when the determination result of step S55 is negative, the processor 81 ends the player object control process, skipping the process of step S56.

In step S56, the processor 81 changes the state regarding the empowerment of the player object to the reference state (that is, a non-empowered state). Specifically, the processor 81 updates the empowered state data of the player object data stored in the storage medium so as to indicate the reference state. Thus, the empowered state of the player object is canceled. After step S56, the processor 81 ends the player object control process.

Figure 15:
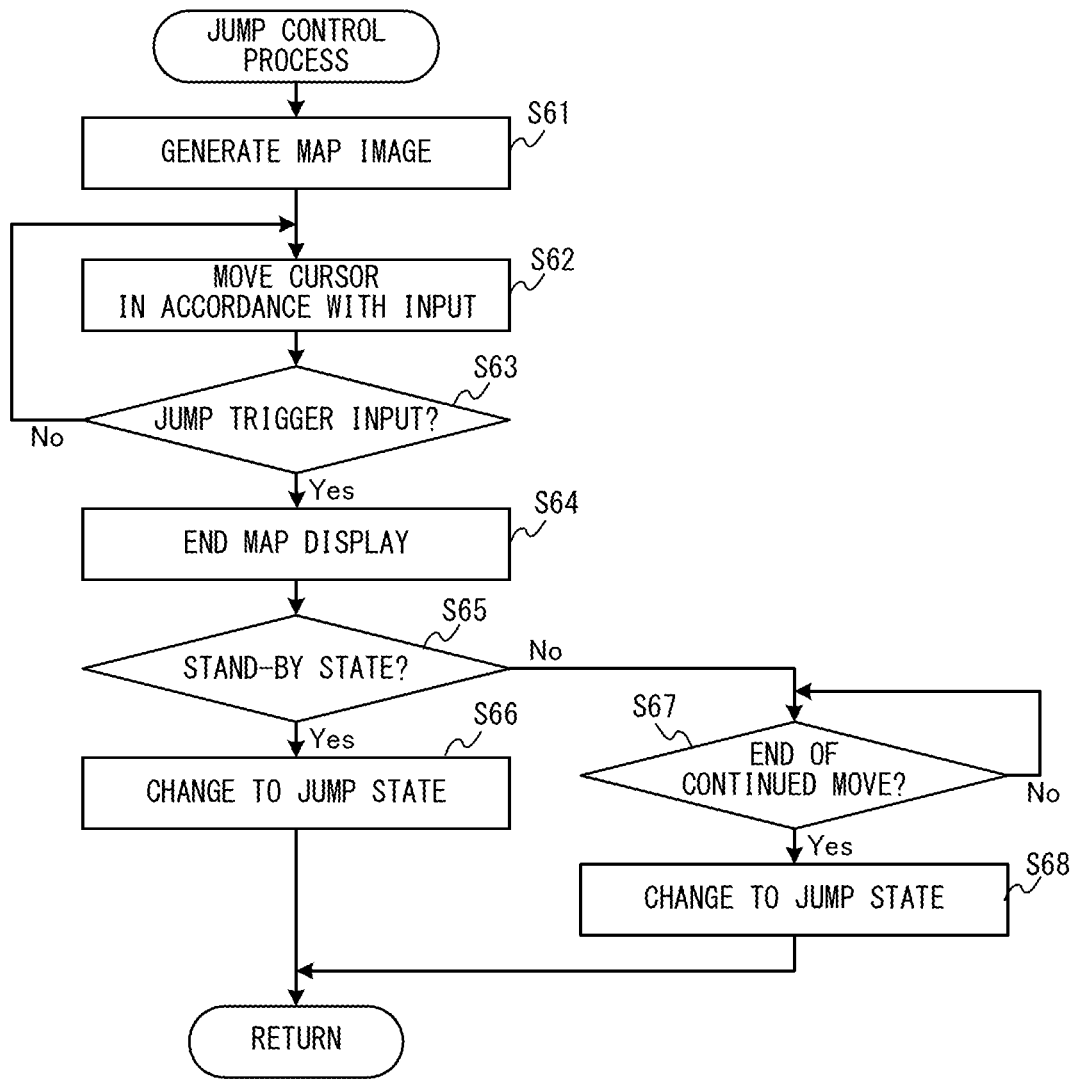
FIG. 15 is a flow chart showing an example of a flow of a jump control process.

FIG. 15 is a flow chart showing an example of the flow of the jump control process. The jump control process is started in response to a map display input made by the player during the execution of the game process (FIG. 12). The series of process steps of the jump control process are executed in parallel to the series of process steps of the game process.

In the jump control process, first, in step S61, the processor 81 generates the map image described above (see FIG. 10). After the execution of the process of step S61, the map image is displayed on the display 12 in step S26 described above until the completion of the process of step S64 to be described below. The process of step S62 is executed, following step S61.

In step S62, the processor 81 moves the cursor (that is, the cursor 232 shown in FIG. 10) on the map image in response to the cursor move input by the player. That is, the processor 81 determines the content of the cursor move input based on the operation data for the player obtained in step S21 so as to arrange the cursor at the position that is specified by the cursor move input. The processor 81 moves teammate markers (that is, the teammate markers 233 to 235 shown in FIG. 10) on the map image in accordance with the positions of the teammate objects. Note that while the process loop of a series of steps S62 to S63 is executed, the process of step S62 is repeatedly executed at a rate of once per a predetermined amount of time (e.g., one frame period). The process of step S63 is executed, following step S62.

In step S63, the processor 81 determines whether a jump trigger input has been made by the player based on the operation data for the player obtained in step S21. When the determination result of step S63 is affirmative, the process of step S64 is executed. On the other hand, when the determination result of step S63 is negative, the process of step S62 is executed again. Thereafter, the process loop of a series of steps S62 to S63 is repeatedly executed until it is determined in step S63 that a jump trigger input has been made.

In step S64, the processor 81 ends the display of the map image. Thus, in step S26 described above to be executed next, an image representing the game space, instead of the map image, is displayed on the display 12. The process of step S65 is executed, following step S64.

In step S65, the processor 81 refers to the action state data of the player object data stored in the storage medium to determine whether the player object is in the stand-by state or the normal state. When the determination result of step S65 is affirmative, the process of step S66 is executed. On the other hand, when the determination result of step S65 is negative, the process of step S67 is executed.

In step S66, the processor 81 changes the action state of the player object to the jump state. Specifically, the processor 81 updates the action state data of the player object data stored in the storage medium so as to indicate the jump state. Thus, in the player object control process (FIG. 13) to be executed next, the determination result of step S51 becomes affirmative, and the player object is controlled to perform a jump move in step S52. Thus, when the player object is in the stand-by state or the normal state, the player object performs a jump move immediately in response to a jump trigger input. After step S66, the processor 81 ends the jump control process.

In step S67, the processor 81 determines whether the continued move of the player object has been ended. When the determination result of step S67 is affirmative, the process of step S68 is executed. On the other hand, when the determination result of step S67 is negative, the process of step S67 is executed again. That is, the processor 81 waits for the execution of the process of step S68 until the determination result of step S67 becomes affirmative.

In step S68, the processor 81 changes the action state of the player object to the jump state. Specifically, the processor 81 updates the action state data of the player object data stored in the storage medium so as to indicate the jump state. Thus, in the player object control process (FIG. 13) to be executed next, the determination result of step S51 becomes affirmative, and the player object is controlled to perform a jump move in step S52. Thus, when in the ready-to-eject state or the ejection state, the player object does not perform a jump move immediately after a jump trigger input, but performs a jump move after the end of the ejection state. The processor 81 sets the amount of time from the completion of the jump move input to the start of the jump move to be shorter when a jump move is performed through the process of step S68 than when a jump move is performed through the process of step S66. After step S68, the processor 81 ends the jump control process.

Note that in the game process, processes similar to the player object control process and the jump control process described above are executed also for other playable objects other than the player object (that is, teammate objects and enemy objects). That is, in the movement target object control process (step S23) described above, a process similar to the player object control process (step S22) is executed, except that an input that is used for controlling the action of the playable object is not an input by the player but is an input by another player and except for whether the object whose action is controlled is the player object or another playable object. In the jump control process, processes similar to steps S63 and S65 to S68 described above are executed for other playable objects except that an input that is used for controlling the action of the playable object is not an input by the player but is an input by another player and except for whether the object whose action is controlled is the player object or another playable object.

Note that in the present embodiment, the game system 1 obtains information representing an input by another player from another game system (step S21), and controls the action of the other playable object based on the information. Here, in other embodiments, the game system 1 may obtain information representing the action of another playable object (e.g., information representing position, attitude, content of action, etc.) from another game system to control the action of the other playable object based on the information.

4. Functions/Effects and Variations of the Present Embodiment

According to the embodiment described above, an information processing program (e.g., the game program) is an information processing program that causes a computer (e.g., the processor 81) of an information processing apparatus (e.g., the game system 1) to execute a game process of controlling a player object and enemy objects on a game stage in a three-dimensional virtual space (e.g., the game space). The information processing program causes the computer to function as units specified below.

a player object control unit (step S31) configured to control a movement of a player object based on an input by a player on a game stage;

an enemy object control unit (step S23) configured to control a movement of an enemy object irrespective of an input by the player on the game stage;

a first display control unit (step S26) configured to display, on a display device, an image of the three-dimensional virtual space as viewed from a viewpoint that is moved in a manner such as to follow the movement of the player object;

a player object exit unit (step S33) configured to cause the player object to exit from the game stage at least when the player object satisfies an exit condition as a result of an attack by an enemy object;

a second display control unit (step S26) configured to display, on the display device, an image of the three-dimensional virtual space (FIG. 6 or FIG. 7) as viewed from a viewpoint of a bird's-eye position where at least a first area (e.g., the ejectable area) of the game stage is viewed from above after the player object exits from the game stage; and a player object return unit (steps S46 and S52) configured to, after the player object exits from the game stage, (a) when a first condition is satisfied (e.g., when the ejection start condition is satisfied), return the player object based on a designated position that is specified by a return input of a first type, which is a position in the first area of the game stage, and (b) when a second condition different from the first condition is satisfied (e.g., when a jump move input is made by the player), return the player object based on a designated position that is specified by a return input of a second type, which is a position of a predetermined movement target object arranged on the game stage.

The player object control unit controls the movement of the player object based on an input by the player after the player object returns onto the game stage.

According to the description above, the player can return the player object onto the game stage by the two methods of (a) and (b) above. Therefore, since the game system 1 can increase the variety of choices that can be employed by the player when returning onto the game stage, it is possible to improve the strategic aspect of the game regarding the return.

Note that "to control a movement of an enemy object irrespective of an input by the player" refers both to an embodiment where the movement of the enemy object is controlled based on an input of another player (that is, the enemy player) other than the player and an embodiment where the game system controls the movement of the enemy object according to an action rule (that is prescribed by the game program, for example). That is, the enemy object may be controlled by a human (that is, an enemy player) or may be controlled by a computer (that is, a game system) without being controlled by a human.

Moreover, "to cause the player object to exit from the game stage at least when the player object satisfies an exit condition as a result of an attack by the enemy object" means to not exclude embodiments where the player object is forced to exit in other cases.

Moreover, "return the player object based on a designated position" means to include any method in which the player object is returned by controlling the movement of the player object based on the designated position. That is, "return the player object based on a designated position" means that it may be an embodiment where the return position of the player object does not always need to be the designated position.

It can also be said that in the embodiment described above, the information processing program causes a computer to function as units specified below.

a player object control unit (step S31) configured to control a movement of a player object based on an input by a player on a game stage;

a teammate object control unit (step S23) configured to control a movement of a teammate object based on an input by a teammate player who is different from the player on the game stage;

an enemy object control unit (step S23) configured to control a movement of an enemy object irrespective of an input by the player on the game stage;

a first display control unit (step S26) configured to display, on a display device, an image of the three-dimensional virtual space as viewed from a viewpoint that is moved in a manner such as to follow the movement of the player object;

a player object exit unit (step S33) configured to cause the player object to exit from the game stage at least when the player object satisfies an exit condition as a result of an attack by an enemy object, and arrange the player object at a first stand-by position that is different from the game stage;

a teammate object exit unit (step S23) configured to cause a teammate object to exit from the game stage at least when the teammate object satisfies an exit condition as a result of an attack by an enemy object, and arrange the teammate object at a second stand-by position that is different from the game stage and different also from the first stand-by position;

a player object return unit (step S46 or S52) configured to, after the player object is arranged at the first stand-by position, return the player object based on a designated position that is specified by a return input by the player, which is a position in a first area of the game stage; and a teammate object return unit (step S23) configured to, after the teammate object is arranged at the second stand-by position, return the teammate object based on a designated position that is specified by a return input by the teammate player, which is a position in the first area.

The player object control unit controls the movement of the player object based on an input by the player after the player object returns onto the game stage. The teammate object control unit controls the movement of a teammate object based on an input by the teammate player after the teammate object returns onto the game stage.

According to the description above, it is possible to vary the environment for returning onto the game stage between playable objects of the player's team. Thus, it is possible to improve the strategic aspect regarding the return onto the game stage.

Note that while it is assumed that the game system 1 causes a playable object to perform two different move actions, i.e., an ejection move and a jump move in the embodiment described above, the game system 1 may cause a playable object to perform only one of the move actions in other embodiments. Also in such an embodiment, as in the embodiment described above, it is possible to vary the environment for returning onto the game stage between playable objects of the player's team.

Note that in other embodiments, the game system 1 does not need to include some of the components of the embodiment described above and does not need to execute some of the processes that are executed in the embodiment described above. For example, in order to realize a specific one of the advantageous effects of the embodiment described above, the game system 1 may include a component or components for realizing the specific advantageous effect and execute a process or processes for realizing the specific advantageous effect, and the game system 1 does not need to include other components and does not need to execute other processes.

In the embodiment described above, the game system 1 restricts a jump move while allowing for only an ejection move by a playable object at the start of the game. Here, in other embodiments, the game system 1 may allow for a jump move by a playable object not only during the game but also at the start of the game. For example, when a predetermined object (e.g., an object of an item) is arranged on the game stage at the start of the game, a playable object may be allowed to perform a jump move with the designated position being the position of the predetermined object.

The embodiment described above can be used in, for example, a game system or a game program with the aim of, for example, improving the strategic aspect of the game.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein instructions that cause a processor of an information processing apparatus to execute a game process that controls a player object and an enemy object on a game stage in a three-dimensional virtual space and, when executed by the processor of the information processing apparatus, cause the information processing apparatus to perform operations comprising:
   controlling a movement of the player object based on an input by a player on the game stage;
   controlling a movement of the enemy object on the game stage;
   displaying, on a display device, an image of the three-dimensional virtual space as viewed from a viewpoint that is moved as to follow the movement of the player object;
   causing the player object to exit from the game stage at least when the player object satisfies an exit condition as a result of an attack by the enemy object;
   displaying, on the display device, an image of the three-dimensional virtual space as viewed from a viewpoint of a bird's-eye position where at least a first area of the game stage is viewed from above, after the player object exits from the game stage;
   determining whether a return input is of a first type or a second type,
      (a) when a return input is of a first type, returning the player object to the game stage based on a position, in the first area of the game, designated by the return input of the first type, or
      (b) when a return input is of a second type, returning the player object to the game stage based on a position, of a target object arranged on the game stage, designated by the return input of the second type; and
   controlling the movement of the player object based on an input by the player after the player object returns onto the game stage.

2. The storage medium according to claim 1, wherein the target object is a teammate object whose movement is controlled based on an input by a teammate player who is different from the player.

3. The storage medium according to claim 1, further having stored therein instructions that cause the information processing apparatus to perform operations comprising:
   when a teammate object satisfies an exit condition as a result of an attack by the enemy object, causing the teammate object to exit from the game stage, wherein a movement of the teammate object is controlled based on an input by a teammate player who is different from the player; and
   when a return input of the first type is made by the teammate player after the teammate object exits from the game stage, returning the teammate object based on a position, in the first area, designated by the return input of the first type by the teammate player.

4. The storage medium according to claim 3, wherein:
   when the player object having satisfied the exit condition exists from the game stage, the player object is arranged at a first stand-by position that is different from the game stage; and when the teammate object having satisfied the exit condition exits from the game stage, the teammate object is arranged at a second stand-by position that is different from the game stage and different also from the first stand-by position.

5. The storage medium according to claim 3, wherein when the position designated by the return input of the first type by the teammate player is included in a range of the game stage that is displayed on the display device, an image representing the designated position is further displayed on the display device.

6. The storage medium according to claim 5, wherein:
an action of the enemy object is controlled by an input by an enemy player who is different from the player and the teammate player; and
the storage medium further has stored therein instructions that cause the information processing apparatus to perform operations comprising:
causing the enemy object to exit from the game stage at least when the enemy object satisfies the exit condition as a result of an attack from the player object or the teammate object; and
after the enemy object exits from the game stage,
(a) returning the enemy object based on a position designated by a return input of the first type by the enemy player, or
(b) returning the enemy object based on a position, of a movement target object arranged on the game stage, designated by a return input of the second type by the enemy player,
wherein even when the position designated by the return input of the first type by the enemy player is included in a range of the game stage that is displayed on the display device, an image representing the designated position is not displayed on the display device.

7. The storage medium according to claim 1, wherein when the player object returns based on the position designated by the return input of the first type, the player object moves in a manner different from that when the player object returns based on the position designated by the return input of the second type.

8. The storage medium according to claim 1, further having stored therein instructions that cause the information processing apparatus to perform operations comprising:
when the enemy object satisfies the exit condition, causing the enemy object to exit from the game stage; and
when a return condition is satisfied after the enemy object exits from the game stage, returning the enemy object to a position in a second area of the game stage,
wherein the first area and the second area each include a portion that does not overlap with the other.

9. The storage medium according to claim 1, further having stored therein instructions that cause the information processing apparatus to perform operations comprising:
when the player object returns based on the position designated by the return input of the first type, giving the player object an effect in the game whereby the exit condition for the player object is less likely to be satisfied for a period of time from the return until elapse of a predetermined first time as compared with after the completion of the period.

10. The storage medium according to claim 1, further having stored therein instructions that cause the information processing apparatus to perform operations comprising:
setting an unrestricted area and a restricted area where the movement of the player object is more restricted than in the unrestricted area in the game stage,
wherein when the player object returns based on the position designated by the return input of the first type, the movement of the player object is controlled without restriction of the restricted area even if the player object is located in the restricted area for a period of time from the return until elapse of a predetermined second time.

11. The storage medium according to claim 1, wherein a position that is different from the game stage is prohibited from being the designated position that is specified by the return input of the first type.

12. The storage medium according to claim 1, wherein when the player object returns based on the position designated by the return input of the first type, the player object moves from a position that is different from the game stage toward the designated position, wherein a moving direction of the player object is changed based on an input by the player during the move.

13. The storage medium according to claim 1, wherein when the return input of the second type is made during a period since a start of the return of the player object in response to the return input of the first type until the return of the player object, the player object moves based on the position designated by the return input of the second type.

14. The storage medium according to claim 1, wherein:
when a predetermined input is made by the player or a first stand-by time elapses after the player object exits from the game stage, the player object transitions to a designated position setting state in which the designated position by the return input of the first type is set; and
the return of the player object is started upon elapse of a second stand-by time since the transition of the player object to the designated position setting state.

15. A non-transitory computer-readable storage medium having stored therein instructions that cause a processor of an information processing apparatus to execute a game process that controls a player object, a teammate object and an enemy object on a game stage in a three-dimensional virtual space and, when executed by the processor of the information processing apparatus, cause the information processing apparatus to perform operations comprising:
controlling a movement of the player object based on an input by a player on the game stage;
controlling a movement of the teammate object based on an input by a teammate player who is different from the player on the game stage;
controlling a movement of the enemy object on the game stage;
displaying, on a display device, an image of the three-dimensional virtual space as viewed from a viewpoint that is moved as to follow the movement of the player object;
causing the player object to exit from the game stage and arranging the player object at a first stand-by position that is different from the game stage at least when the player object satisfies an exit condition as a result of an attack by the enemy object;
causing the teammate object to exit from the game stage and arranging the teammate object at a second stand-by position that is different from the game stage and different also from the first stand-by position at least when the teammate object satisfies the exit condition as a result of an attack by the enemy object;
after the player object is arranged at the first stand-by position, returning the player object based on a position, in at least a first area of the game stage, designated by a return input by the player;

after the teammate object is arranged at the second stand-by position, returning the teammate object based on a position, in at least the first area of the game stage, designated by a return input by the teammate player;

after the player object returns onto the game stage, controlling a movement of the player object based on an input by the player; and after the teammate object returns onto the game stage, controlling a movement of the teammate object based on an input by the teammate player.

16. The storage medium according to claim 15, wherein when the position designated by a return input of the first type by the teammate player is included in a range of the game stage that is displayed on the display device, an image representing the designated position is further displayed on the display device.

17. The storage medium according to claim 16, wherein:
an action of the enemy object is controlled by an input by an enemy player who is different from the player and the teammate player; and
the storage medium further has stored therein instructions that cause the information processing apparatus to perform operations comprising:
causing the enemy object to exit from the game stage at least when the enemy object satisfies the exit condition as a result of an attack from the player object or the teammate object; and
after the enemy object exits from the game stage,
(a) returning the enemy object based on a position designated by a return input of the first type by the enemy player, and
(b) returning the enemy object based on a position, of a movement target object arranged on the game stage, designated by a return input of the second type by the enemy player,
wherein even when the position designated by the return input of the first type by the enemy player is included in a range of the game stage that is displayed on the display device, an image representing the designated position is not displayed on the display device.

18. The storage medium according to claim 15, further having stored therein instructions that cause the information processing apparatus to perform operations comprising:
when the enemy object satisfies the exit condition, causing the enemy object to exit from the game stage; and
when a return condition is satisfied after the enemy object exits from the game stage, returning the enemy object to a position in a second area of the game stage,
wherein the first area and the second area each include a portion that does not overlap with the other.

19. The storage medium according to claim 15, further having stored therein instructions that cause the information processing apparatus to perform operations comprising:
when the player object returns based on the position designated by the return input of the first type, giving the player object an effect in the game whereby the exit condition for the player object is less likely to be satisfied for a period of time from the return until elapse of a predetermined first time as compared with after the completion of the period.

20. The storage medium according to claim 15, further having stored therein instructions that cause the information processing apparatus to perform operations comprising:
setting an unrestricted area and a restricted area where the movement of the player object is more restricted than in the unrestricted area in the game stage,
wherein when the player object returns based on the position designated by the return input of the first type, the movement of the player object is controlled without restriction of the restricted area even if the player object is located in the restricted area for a period of time from the return until elapse of a predetermined second time.

21. The storage medium according to claim 15, wherein a position that is different from the game stage is prohibited from being the position designated by the return input of the first type.

22. The storage medium according to claim 15, wherein when the player object returns based on the position designated by the return input of the first type, the player object moves from a position that is different from the game stage toward the designated position, wherein a moving direction of the player object is changed based on an input by the player during the move.

23. The storage medium according to claim 15, wherein when the return input of the second type is made during a period since a start of the return of the player object in response to the return input of the first type until the return of the player object, the player object moves based on the position designated by the return input of the second type.

24. The storage medium according to claim 15, wherein:
when a predetermined input is made by the player or a first stand-by time elapses after the player object exits from the game stage, the player object transitions to a designated position setting state in which the position designated by the return input of the first type is set; and
the return of the player object is started upon elapse of a second stand-by time since the transition of the player object to the designated position setting state.

25. An information processing system configured to execute a game process that controls a player object and an enemy object on a game stage in a three-dimensional virtual space, the information processing system comprising:
a processor; and
a memory configured to store computer readable instructions that, when executed by the processor, cause the information processing system to:
control a movement of the player object based on an input by a player on the game stage;
control a movement of the enemy object on the game stage;
display, on a display device, an image of the three-dimensional virtual space as viewed from a viewpoint that is moved as to follow the movement of the player object;
cause the player object to exit from the game stage at least when the player object satisfies an exit condition as a result of an attack by the enemy object;
display, on the display device, an image of the three-dimensional virtual space as viewed from a viewpoint of a bird's-eye position where at least a first area of the game stage is viewed from above after the player object exits from the game stage;
determining whether a return input is of a first type or a second type,
(a) when a return input is of a first type, return the player object to the game stage based on a position, in the first area of the game, designated by the return input of the first type, or
(b) when a return input is of a second type, return the player object to the game stage based on a position, of a target object arranged on the game stage, designated by the return input of the second type; and control the movement of the player object based on an input by the player after the player object returns onto the game stage.

26. An information processing apparatus configured to execute a game process that controls a player object and an enemy object on a game stage in a three-dimensional virtual space, the information processing apparatus comprising:
a display device; and
processing circuitry including at least a processor and a memory, wherein the processing circuitry is operatively coupled to the display device, and the processing circuitry is configured to:
control a movement of the player object based on an input by a player on the game stage;
control a movement of the enemy object on the game stage;
display, on the display device, an image of the three-dimensional virtual space as viewed from a viewpoint that is moved as to follow the movement of the player object;
cause the player object to exit from the game stage at least when the player object satisfies an exit condition as a result of an attack by the enemy object;
display, on the display device, an image of the three-dimensional virtual space as viewed from a viewpoint of a bird's-eye position where at least a first area of the game stage is viewed from above after the player object exits from the game stage;
determining whether a return input is of a first type or a second type,
  (a) when a return input is of a first type, return the player object to the game stage based on a position, in the first area of the game, designated by the return input of the first type, or
  (b) when a return input is of a second type, return the player object to the game stage based on a position, of a target object arranged on the game stage, designated by the return input of the second type; and
control the movement of the player object based on an input by the player after the player object returns onto the game stage.

27. An information processing method to be executed by an information processing system that executes a game process that controls a player object and an enemy object on a game stage in a three-dimensional virtual space, the information processing method comprising:
controlling a movement of the player object based on an input by a player on the game stage;
controlling a movement of the enemy object on the game stage;
displaying, on a display device, an image of the three-dimensional virtual space as viewed from a viewpoint that is moved as to follow the movement of the player object;
causing the player object to exit from the game stage at least when the player object satisfies an exit condition as a result of an attack by the enemy object;
displaying, on the display device, an image of the three-dimensional virtual space as viewed from a viewpoint of a bird's-eye position where at least a first area of the game stage is viewed from above after the player object exits from the game stage;
determining whether a return input is of a first type or a second type,
  (a) when a return input is of a first type, returning the player object to the game stage based on a position, in the first area of the game, designated by the return input of the first type, or
  (b) when a return input is of a second type, returning the player object to the game stage based on a position, of a target object arranged on the game stage, designated by the return input of the second type; and
controlling the movement of the player object based on an input by the player after the player object returns onto the game stage.

28. An information processing system configured to execute a game process that controls a player object, a teammate object and an enemy object on a game stage in a three-dimensional virtual space, the information processing system comprising:
a processor; and
a memory configured to store computer readable instructions that, when executed by the processor, cause the information processing system to:
control a movement of the player object based on an input by a player on the game stage;
control a movement of the teammate object based on an input by a teammate player who is different from the player on the game stage;
control a movement of the enemy object on the game stage;
display, on a display device, an image of the three-dimensional virtual space as viewed from a viewpoint that is moved as to follow the movement of the player object;
cause the player object to exit from the game stage and arrange the player object at a first stand-by position that is different from the game stage at least when the player object satisfies an exit condition as a result of an attack by the enemy object;
cause the teammate object to exit from the game stage and arrange the teammate object at a second stand-by position that is different from the game stage and different also from the first stand-by position at least when the teammate object satisfies the exit condition as a result of an attack by the enemy object;
after the player object is arranged at the first stand-by position, return the player object based on a position, in at least a first area of the game stage, designated by a return input by the player;
after the teammate object is arranged at the second stand-by position, return the teammate object based on a position, in at least the first area of the game stage, designated by a return input by the teammate player;
after the player object returns onto the game stage, control a movement of the player object based on an input by the player; and
after the teammate object returns onto the game stage, control a movement of the teammate object based on an input by the teammate player.

29. An information processing apparatus configured to execute a game process that controls a player object, a teammate object and an enemy object on a game stage in a three-dimensional virtual space, the information processing apparatus comprising:
a display device; and
processing circuitry including at least a processor and a memory, wherein the processing circuitry is operatively coupled to the display device, and the processing circuitry is configured to:

control a movement of the player object based on an input by a player on the game stage;
control a movement of the teammate object based on an input by a teammate player who is different from the player on the game stage;
control a movement of the enemy object on the game stage;
display, on a display device, an image of the three-dimensional virtual space as viewed from a viewpoint that is moved as to follow the movement of the player object;
cause the player object to exit from the game stage and arrange the player object at a first stand-by position that is different from the game stage at least when the player object satisfies an exit condition as a result of an attack by the enemy object;
cause the teammate object to exit from the game stage and arrange the teammate object at a second stand-by position that is different from the game stage and different also from the first stand-by position at least when the teammate object satisfies the exit condition as a result of an attack by the enemy object;
after the player object is arranged at the first stand-by position, return the player object based on a position, in at least a first area of the game stage, designated by a return input by the player;
after the teammate object is arranged at the second stand-by position, return the teammate object based on a position, in at least the first area of the game stage, designated by a return input by the teammate player;
after the player object returns onto the game stage, control a movement of the player object based on an input by the player; and
after the teammate object returns onto the game stage, control a movement of the teammate object based on an input by the teammate player.

30. An information processing method to be executed by an information processing system that executes a game process that controls a player object, a teammate object and an enemy object on a game stage in a three-dimensional virtual space, the information processing method comprising:
controlling a movement of the player object based on an input by a player on the game stage;
controlling a movement of the teammate object based on an input by a teammate player who is different from the player on the game stage;
controlling a movement of the enemy object on the game stage;
displaying, on a display device, an image of the three-dimensional virtual space as viewed from a viewpoint that is moved as to follow the movement of the player object;
causing the player object to exit from the game stage and arrange the player object at a first stand-by position that is different from the game stage at least when the player object satisfies an exit condition as a result of an attack by the enemy object;
causing the teammate object to exit from the game stage and arrange the teammate object at a second stand-by position that is different from the game stage and different also from the first stand-by position at least when the teammate object satisfies the exit condition as a result of an attack by the enemy object;
after the player object is arranged at the first stand-by position, returning the player object based on a position, in at least a first area of the game stage, designated by a return input by the player;
after the teammate object is arranged at the second stand-by position, returning the teammate object based on a position, in at least the first area of the game stage, designated by a return input by the teammate player;
after the player object returns onto the game stage, controlling a movement of the player object based on an input by the player; and
after the teammate object returns onto the game stage, controlling a movement of the teammate object based on an input by the teammate player.

* * * * *